US007929181B2

(12) United States Patent
Miyazaki

(10) Patent No.: US 7,929,181 B2
(45) Date of Patent: Apr. 19, 2011

(54) POOR RECORDING DETECTION DEVICE AND IMAGE RECORDING APPARATUS USING THE SAME

(75) Inventor: Yasuhiro Miyazaki, Tokyo (JP)

(73) Assignee: Olympus Corporation, Tokyo (JP)

( * ) Notice: Subject to any disclaimer, the term of this patent is extended or adjusted under 35 U.S.C. 154(b) by 699 days.

(21) Appl. No.: 12/002,496

(22) Filed: Dec. 17, 2007

(65) Prior Publication Data

US 2008/0205223 A1   Aug. 28, 2008

(30) Foreign Application Priority Data

Dec. 19, 2006  (JP) ................................ 2006-341830
Oct. 10, 2007  (JP) ................................ 2007-264884

(51) Int. Cl.
*G06F 15/00* (2006.01)
*G06K 1/00* (2006.01)
(52) U.S. Cl. ........................ 358/1.9; 358/3.26; 358/1.14
(58) Field of Classification Search .................. 358/1.1, 358/1.9, 3.24, 3.26, 1.14, 501, 504, 400, 358/401, 406, 296; 382/309
See application file for complete search history.

(56) References Cited

U.S. PATENT DOCUMENTS 4,414,579 A * 11/1983 Dattilo et al. ................. 358/498
6,038,035 A *  3/2000 Wulforst ...................... 358/406

FOREIGN PATENT DOCUMENTS

JP        7-89063 A   4/1995
JP    2003-054095 A   2/2003

* cited by examiner

*Primary Examiner* — Thomas D Lee
(74) *Attorney, Agent, or Firm* — Holtz, Holtz, Goodman & Chick, PC

(57) ABSTRACT

A poor recording detection device includes an illumination unit which applies illumination light to a recording medium after recording on the recording medium and a camera unit which picks up an image recorded on the recording medium to which the illumination light is applied and outputs detected information. A poor recording determination unit outputs reference detection information obtained by detecting a reference recording image by the camera unit after recording the reference recording data on the recording medium as input recording data, generates correction information by comparing the reference detection information with the reference recording data and generates corrected input recording data obtained by correcting the input recording data on the basis of the correction information, and detects a poor recording by comparing the input recording image information and the corrected input recording data after recording the input recording data on the recording medium.

11 Claims, 22 Drawing Sheets

MAIN SCANNING DIRECTION
SUB SCANNING DIRECTION
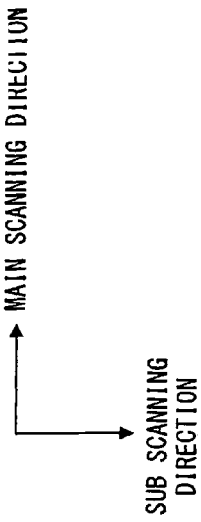
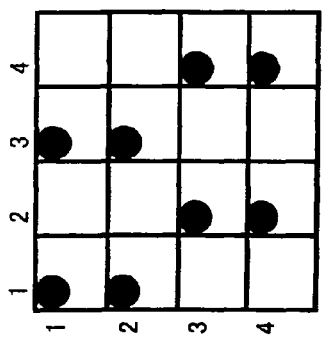
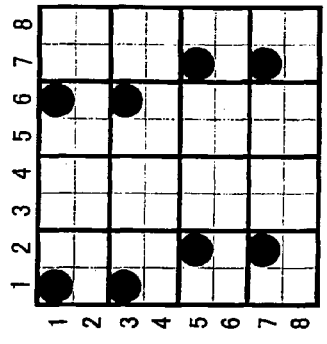
F I G. 4 A    REFERENCE RECORDING DATA
F I G. 4 B    REFERENCE DETECTION INFORMATION
F I G. 4 C    CORRECTION INFORMATION
(CORRESPONDING TO REFERENCE RECORDING DATA ARRAY)
— : LEFT SIDE, + : RIGHT SIDE
F I G. 4 D    CORRECTION INFORMATION STRING

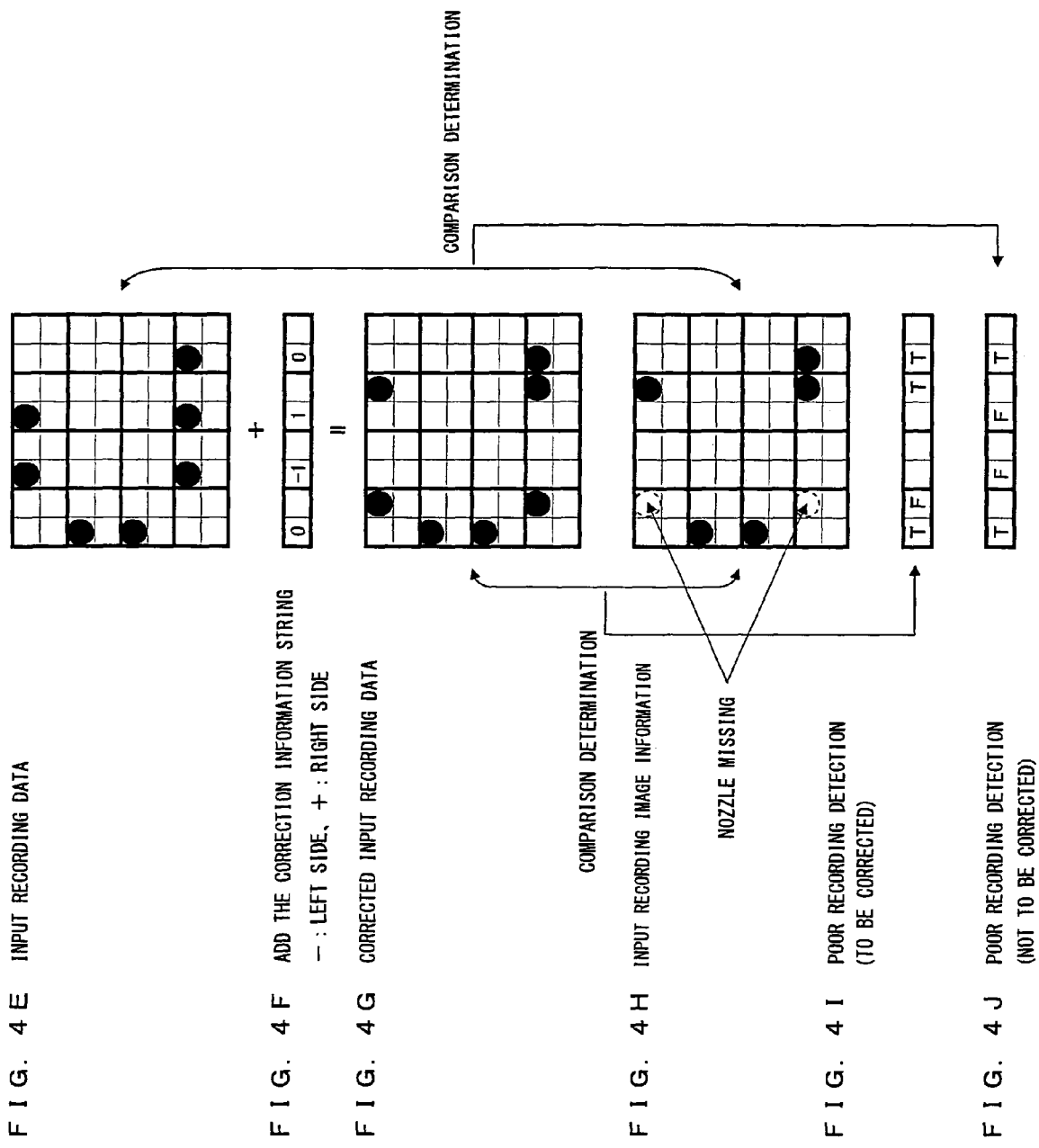

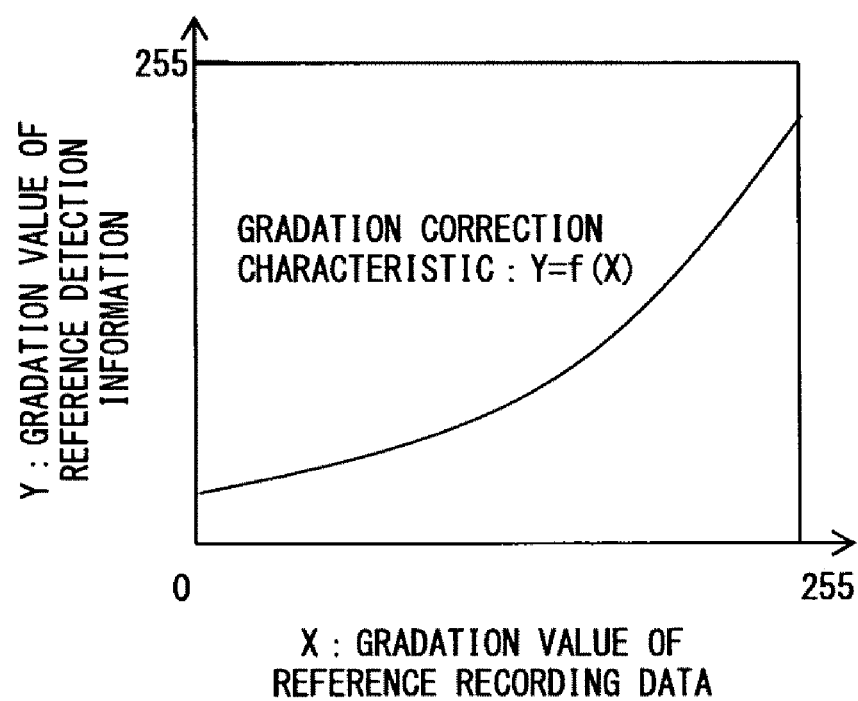
F I G. 5

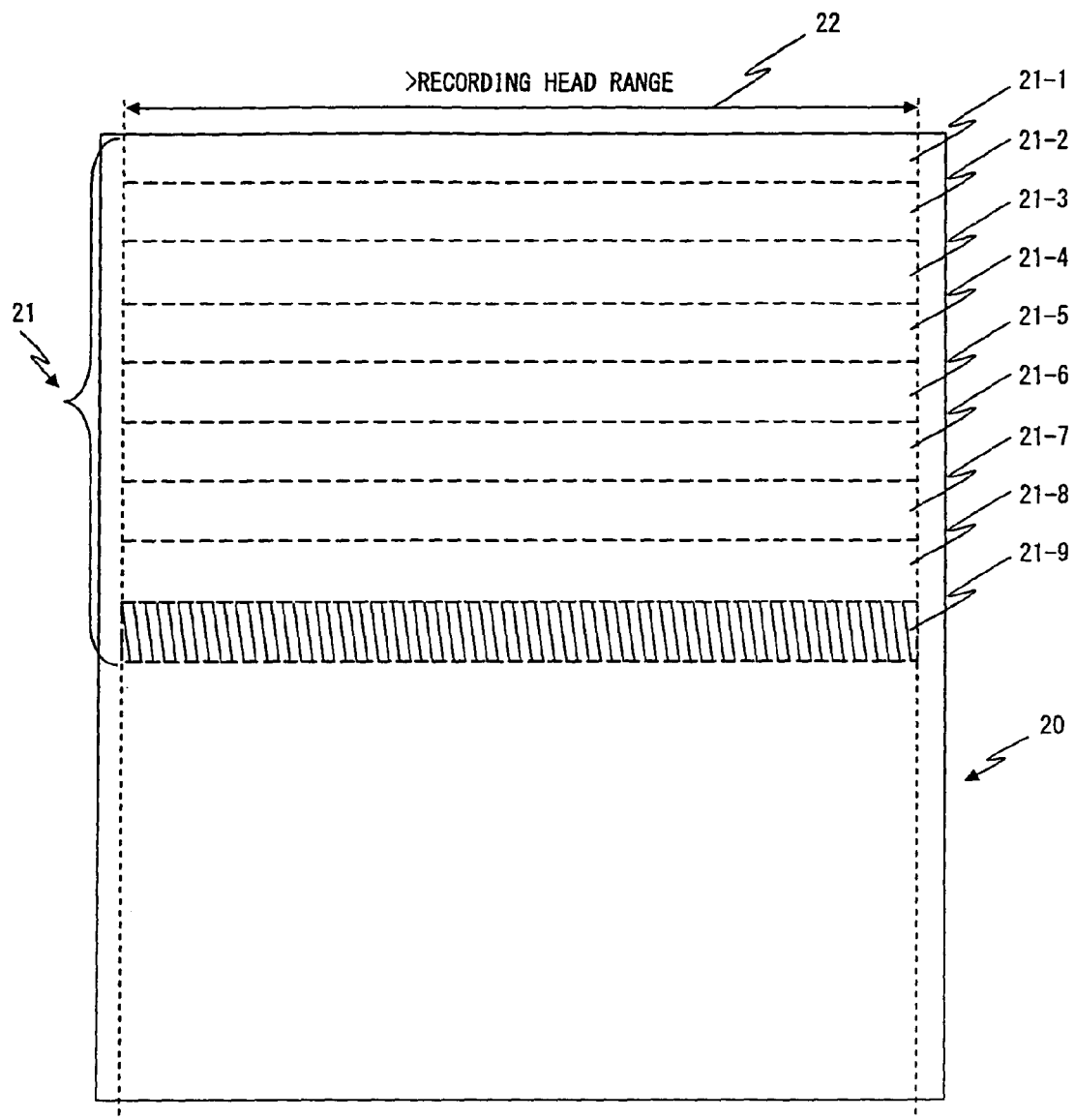
F I G. 6 A

IN THIS DRAWING, THE NUMERICAL VALUE OF EACH PIXEL SHOWS A DENSITY VALUE AND WHITE AND BLACK ARE DEFINED TO BE 0 AND 255, RESPECTIVELY.
F I G. 8 A   REFERENCE RECORDING DATA
F I G. 8 B   REFERENCE DETECTION INFORMATION
DATA READ WITH 600DPI BY A SCANNER AFTER RECORDING THE REFERENCE RECORDING DATA.
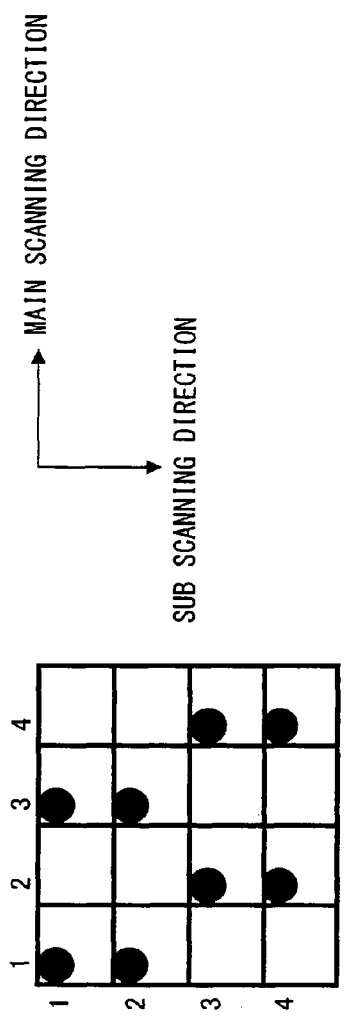
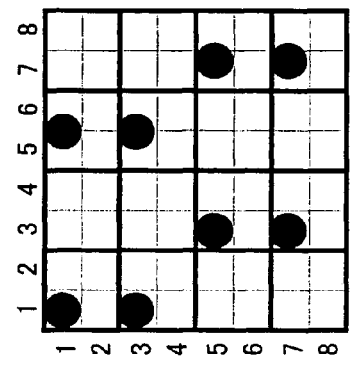

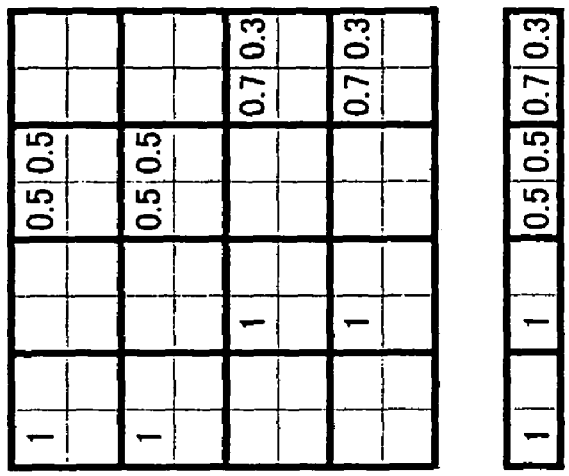
FIG. 8C CORRECTION INFORMATION BLANK INDICATES 0.
DENSITY OPERATION RESULT OF FIG. 8B
THE NUMERICAL VALUE IS A DENSITY
RATIO DISTRIBUTED TO EACH PIXEL BY
ONE DOT.
↓
DENSITY RATIO NORMALIZED IN THE RANGE
OF ADJACENT PIXELS (256 IS NORMALIZED
INTO 1).
FIG. 8D CORRECTION INFORMATION
STRING LINEAR CORRECTION INFORMATION
AVERAGE IN THE CARRYING DIRECTION
OF A VALID PIXEL

FIG. 8E INPUT RECORDING DATA

ASSIGNED TO 600DPI.

FIG. 8F ADD THE CORRECTION INFORMATION STRING (FIG. 8D) TO THE INPUT RECORDING DATA AND OPERATE THE CORRECTION INFORMATION.

FIG. 8G CORRECTED INPUT RECORDING DATA

COMPARISON DETERMINATION (NOT TO BE CORRECTED)

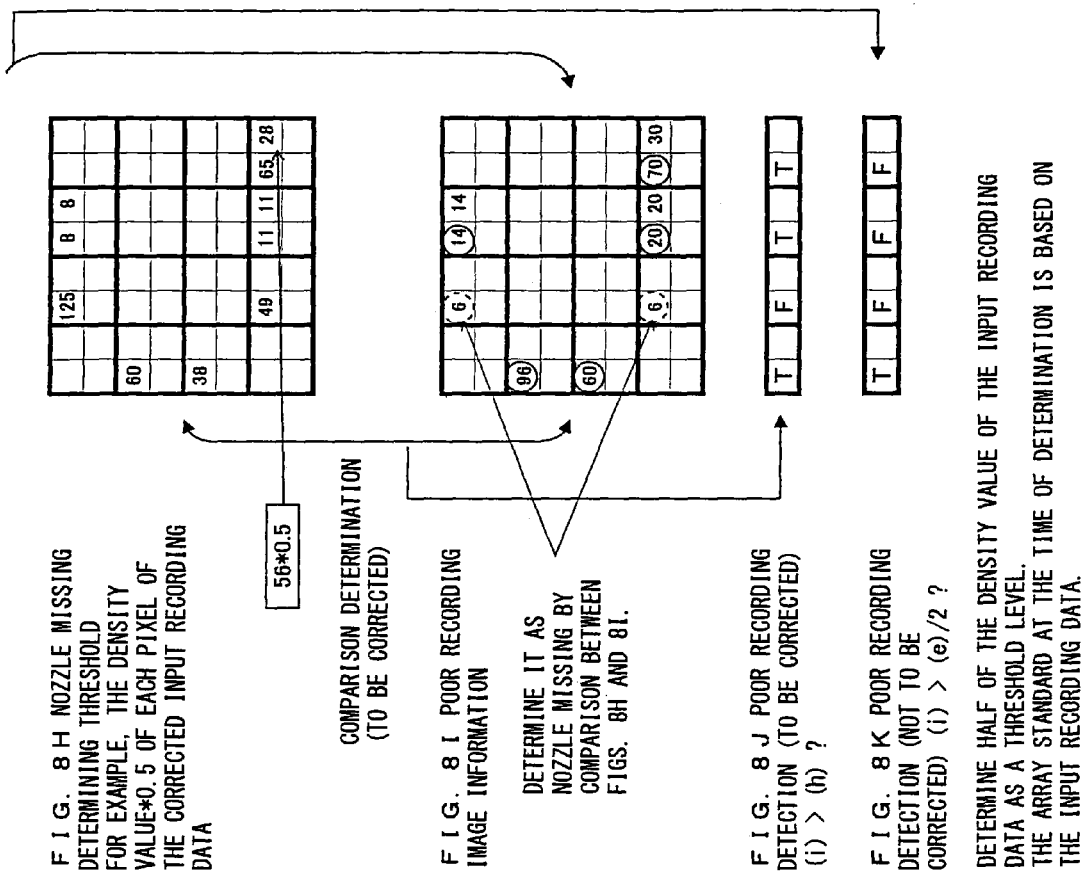

IN THIS DRAWING, THE NUMERICAL VALUE OF EACH PIXEL SHOWS A DENSITY VALUE AND WHITE AND BLACK ARE DEFINED TO BE 0 AND 255, RESPECTIVELY.

F I G. 1 0 A REFERENCE RECORDING DATA

F I G. 1 0 B REFERENCE DETECTION INFORMATION

DATA READ WITH 600DPI BY A SCANNER AFTER RECORDING THE REFERENCE RECORDING DATA.

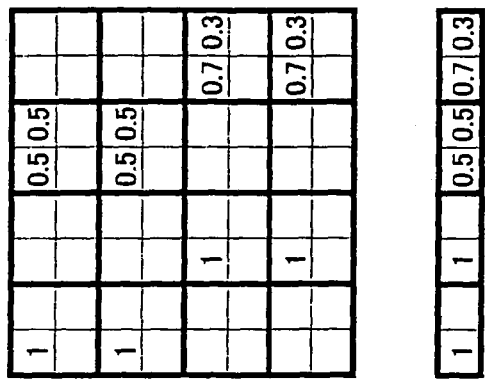

FIG. 10C CORRECTION INFORMATION

BI-DIMENSIONAL CORRECTION INFORMATION
THE NUMERICAL VALUE IS A DENSITY
RATIO DISTRIBUTED TO EACH PIXEL BY
ONE DOT.
↓
DENSITY RATIO NORMALIZED IN THE RANGE
OF ADJACENT PIXELS (256 IS NORMALIZED
INTO 1).

BI-DIMENSIONAL CORRECTION
INFORMATION
BLANK INDICATES 0.

FIG. 10D CORRECTION INFORMATION STRING

AVERAGE IN THE CARRYING DIRECTION
OF A VALID PIXEL

LINEAR CORRECTION INFORMATION

FIG. 10E INPUT RECORDING DATA
ASSIGNED TO 600DPI.

FIG. 10F ADD THE CORRECTION INFORMATION STRING (FIG.10D) TO THE INPUT RECORDING DATA AND OPERATE THE CORRECTION INFORMATION.
FIG. 10G CORRECTED INPUT RECORDING IMAGE INFORMATION

FIG. 10H INPUT RECORDING DATA

|  |  |  | 187 |
|---|---|---|---|
|  | 30 |  | 42 |
| 250 |  |  | 98 |
|  | 120 | 75 |  |

FIG. 10I NOZZLE MISSING DETERMINING THRESHOLD (FOR EXAMPLE, THE DENSITY VALUE*0.5 OF EACH PIXEL OF THE CORRECTED INPUT RECORDING DATA)

|  |  |  | 94 |
|---|---|---|---|
|  | 15 |  | 21 |
| 125 |  |  | 49 |
|  | 60 | 38 |  |

187*0.5

FIG. 10J POOR RECORDING DETECTION (TO BE CORRECTED) (g) > (i) ?

| T | T |
|---|---|
| T | F |
| T | F |
| T | F |

FIG. 10K POOR RECORDING DETECTION (NOT TO BE CORRECTED) (e) > (i) ?

| F | F |
|---|---|
| F | F |
| F | F |
| T | F |

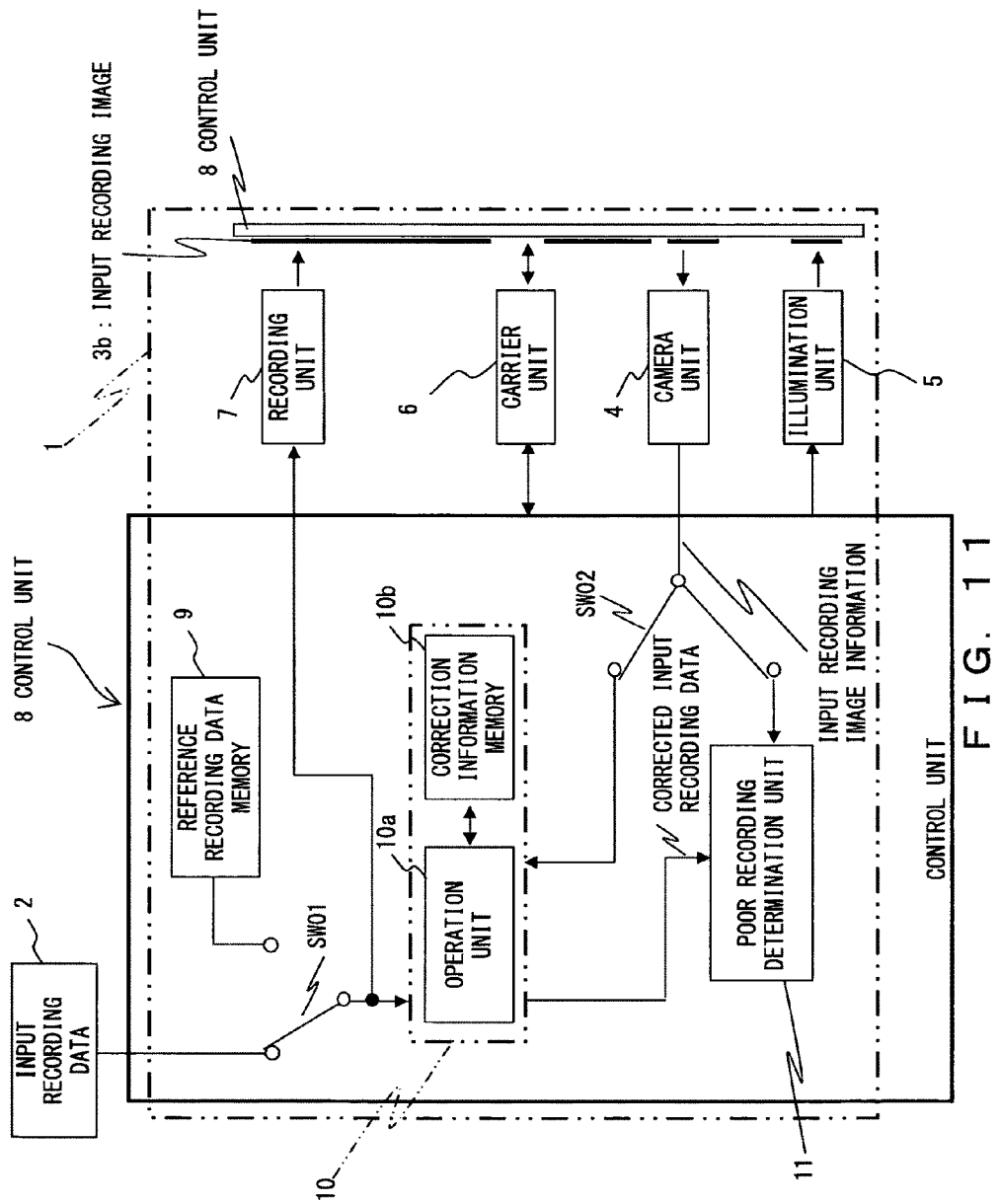
F I G. 11

POOR RECORDING DETECTION DEVICE AND IMAGE RECORDING APPARATUS USING THE SAME

CROSS REFERENCE TO RELATED APPLICATIONS

This application claims priority from Japanese Patent Application Nos. 2006-341830 filed on Dec. 19, 2006 and 2007-264884 filed on Oct. 10, 2007, which is incorporated hereinto by this reference.

BACKGROUND OF THE INVENTION

1. Field of the Invention

The present invention relates to an image recording apparatus for recording images by fusing ink or the like into a recording medium, such as paper, film or the like, and more particularly to a poor recording detection device for detecting poor recording when recording data on a recording medium by the recording head of an image recording apparatus and an image recording apparatus using it.

2. Description of the Related Art

Some image recording apparatus for recording images by fusing ink into a recording medium, such as a large amount of papers, films or the like records an image while carrying the recording medium at a high speed of several tens~several hundreds m/min. In such high-speed image recording it is impossible to visually check whether image data transmitted from a higher-level device coincides with a recorded image by human eyes. Even in low-speed image recording, sometimes visual check by human eyes lacks accuracy. Therefore, in such an image recording apparatus a technology for electronically reading a recorded image and detecting poor recording by comparing this image with an image represented by image data transmitted from a higher-level device dot by dot is proposed.

For example, Japanese Patent Application No. 2003-54095 discloses an invention whose object is to make an accurate inspection by reading the printing image of a printing matter and enabling it to appropriately correspond to image data by correcting its skew by a simple method when checking a printed result by matching it with its original printing image data. It checks the printed result by attaching a reference line to inputted printing image data by a reference mark attachment unit and printing it, reading printed image read by a scanner unit for each line by a position correction unit, sliding and correcting the data for each line in such a way that the utmost-left dot may be positioned in the reference line attached by the reference attachment unit and collating it with the original printing image data.

Japanese Patent Application No. H7-89063 discloses an invention whose object is to enable the detection of a very small defect in a printing matter inspection system by aligning the printing matter with high accuracy. It extracts printing dots that appears for the first time when scanning a printed image while searching for printing dots in a specific direction, measures the inclination of a straight line, approximated by the extracted dot string as the inclination of an input image and correcting the read printed image by linearly transforming the measured inclination as a rotation parameter.

SUMMARY OF THE INVENTION

A poor recording detection device in the major aspect of the present invention forms dots on a recording medium on the basis of input recording data and detects poor recording when recording it. The poor recording detection device comprises an illumination unit for applying illumination light to the recording medium after the recording is performed and a camera unit for shooting and sensing the image recorded on the recording medium to which the illumination unit applies the illumination light and outputting detected information. After specifying a reference recording data as input recording data and recording it a reference recording image on the recording medium, the poor recording detection device outputs reference detected information by which the camera unit checks the reference recording image, generates correction information by comparing the reference detected information with the reference recording data and makes corrected input recording data corrected on the basis of the correction information of the input recording data. The poor recording detection device further comprises a poor recording determination unit for determining whether there is the poor recording on the basis of the comparison result between the input recording image information detected and obtained by the camera unit with the correction input recorded data after recording the input recording data on the recording medium as an input recording image.

BRIEF DESCRIPTION OF THE DRAWINGS

FIG. 4A shows one example of reference recording data being the reference for calibration.

FIG. 4B bi-dimensionally shows data detected as reference detected information by the camera unit after recording reference recording data on a recording medium.

FIG. 4C shows one example of correction information.

FIG. 4D shows one example of a correction information string.

FIG. 4E shows one example of input recording data.

FIG. 4F shows one example of a correction information string.

FIG. 4G shows one example of corrected input recording data.

FIG. 4H shows one example of input recording image information.

FIG. 4I shows a poor determination result obtained when performing this correction process.

FIG. 4J shows a poor determination result obtained when not performing this correction process.

FIG. 5 shows a gradation correction characteristic by gradation correction information.

FIG. 6A shows an example of the image pattern of reference recording data.

FIG. 8A shows one example of the reference recording data being the reference for calibration.

FIG. 8B bi-dimensionally shows data detected as reference detected information by the camera unit after recording reference recording data on a recording medium.

FIG. 8C shows one example of correction information.

FIG. 8D shows one example of a correction information string.

FIG. 8E shows one example of input recording data.

FIG. 8F shows one example of a correction information string.

FIG. 8G shows one example of corrected input recording data.

FIG. 8H shows one example of input recording image information.

FIG. 8I shows one example of a nozzle missing determination threshold.

FIG. 8J shows a poor determination result obtained when performing this correction process.

FIG. 8K shows a poor determination result obtained when not performing this correction process.

FIG. 11 shows the conceptual block configuration at the time of the normal recording operation of the poor recording detection device in the second preferred embodiment.

DESCRIPTION OF THE PREFERRED EMBODIMENTS

The preferred embodiments of the present invention with reference to the drawings below. In the following description, the carrying direction of a recording medium and the direction diagonal to this carrying direction are defined as a sub-scanning direction and a main scanning direction, respectively.

Figure 1:
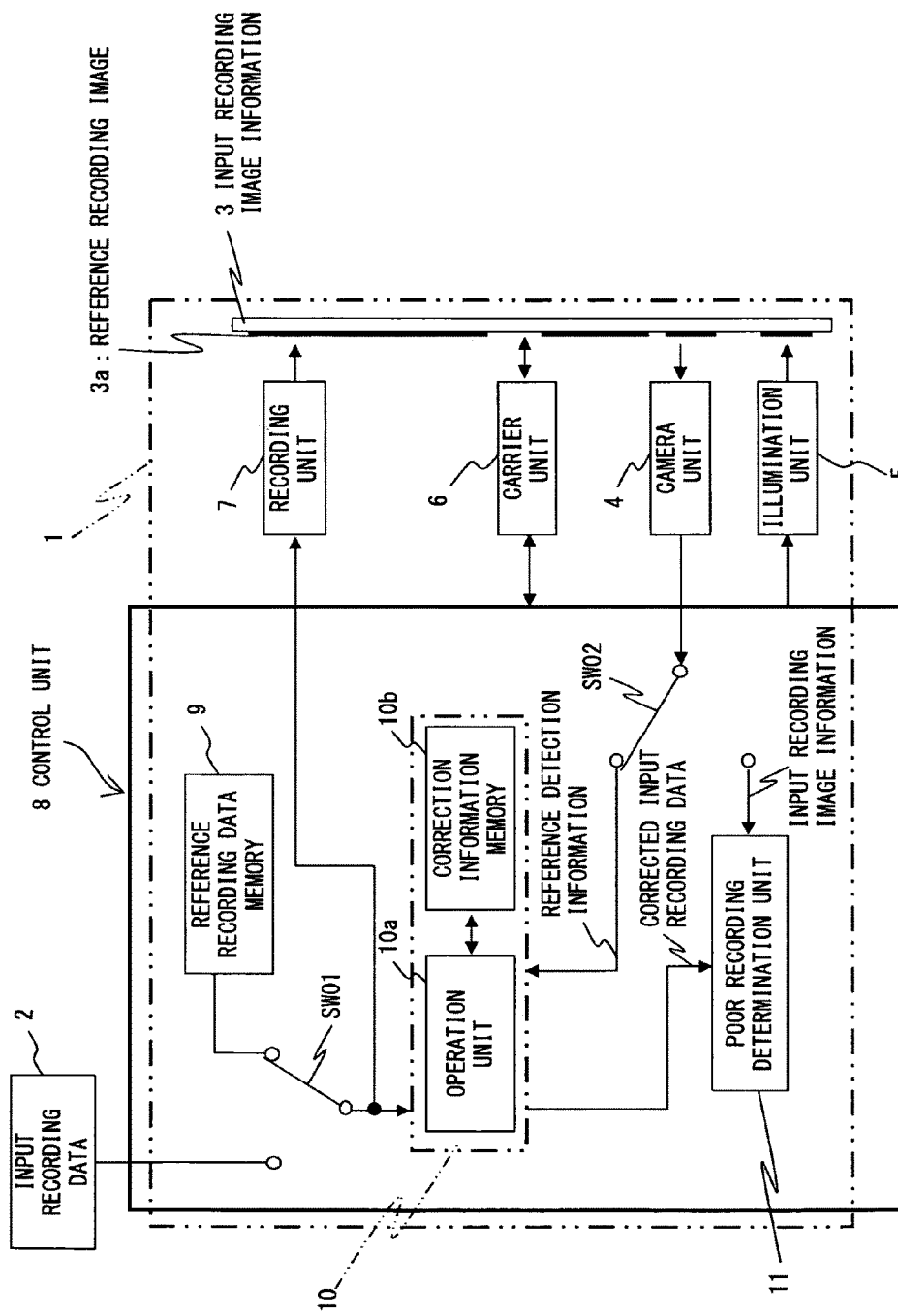
FIG. 1 shows the conceptual block configuration at the time of the calibrating operation of the poor recording detection device in the first preferred embodiment.
Figure 2:
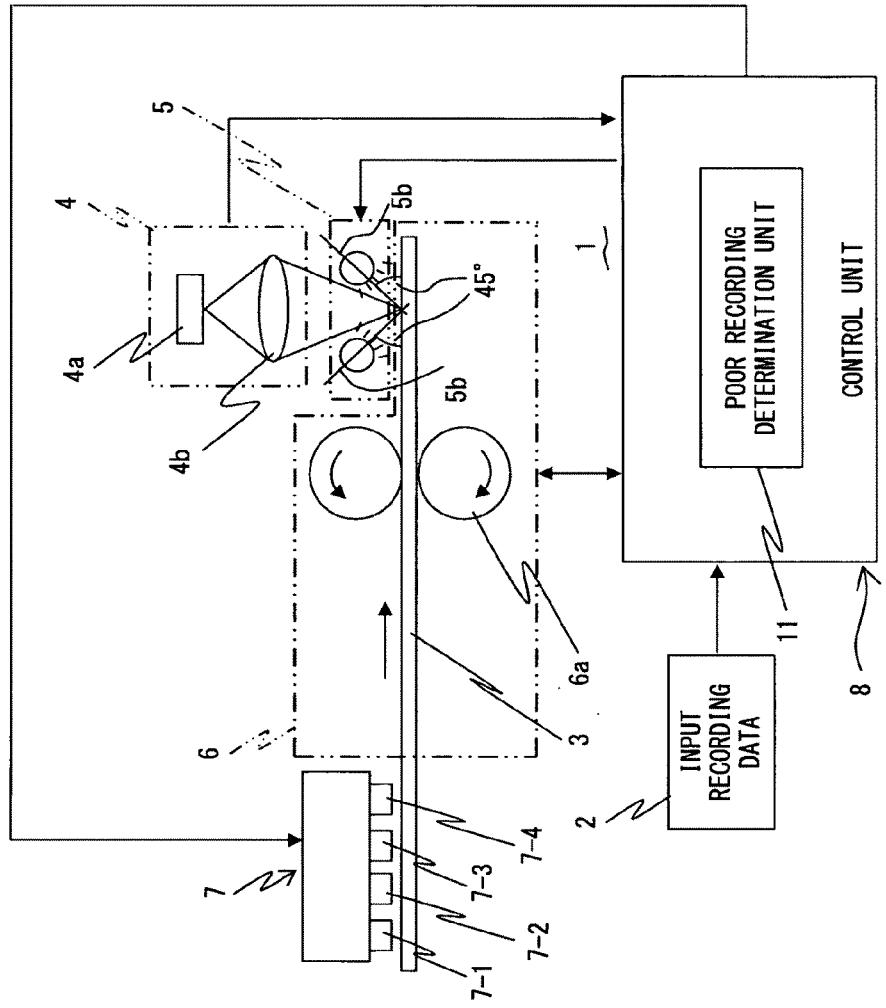
FIG. 2 shows the arrangement of each component of the poor recording detection device.

FIG. 1 shows the conceptual block configuration at the time of the calibrating operation of the poor recording detection device in the first preferred embodiment. FIG. 2 shows the arrangement of each component of the poor recording detection device in the image recording apparatus 30 in this preferred embodiment.

Input recording data 2 is inputted to the image recording apparatus 30 from a higher-level device, such as a personal computer (PC) or the like. The image recording apparatus 30 records an image on a recording medium 3, such as paper, film or the like, on the basis of this input recording data 2. The poor recording detection device 1 in this preferred embodiment detects poor recording, for example, by discharging ink from the nozzle of an ink-jet recording head and fusing it when recording an image composed of linearly or bi-dimensionally arrayed dots.

The poor recording detection device 1 comprises a camera unit 4, an illumination unit 5, a carrier unit 6, a recording unit 7 and a control unit 8. The control unit 8 comprises at least reference recording data memory 9, an image correction unit 10 including an operation unit 10a and correction information memory 10b and a poor recording determination unit 11.

The input recording data 2 being basic recording information transmitted from a higher-level device is inputted to the control unit 8. The control unit 8 has normal control functions as the image recording apparatus 30, to develop image data and enable the recording head of the recording unit 7 to discharge ink with appropriate mapping and density, to operate the carrier unit 6, to adjust recording timing with the recording head and the like. The image recording apparatus 30 comprises the paper feeding unit, paper ejecting unit and the like, which are not shown in FIG. 1, of the recording medium 3.

The camera unit 4 shoots the image of the recording medium 3 recorded as described above and converts the obtained image (detected information) into digital data. The illumination unit 5 applies light to the recorded recording medium 3 to form a secondary light source surface for shooting. Furthermore, the carrier unit 6 moves the recorded recording medium 3 to within the effective view range of the camera unit 4 and the illumination unit 5.

The control unit 8 controls recording medium shooting timing with the camera unit 4, the illumination unit 5, the carrier unit 6 and the recording unit 7 and unifies the acquisition of the input recording data 2 transmitted from a higher-level device, the control of the recording unit 7, a pre-treatment for comparing with image information detected by the camera unit 4, the acquisition of the image information detected by the camera unit 4 and the like.

The control unit 8 also controls the image correction unit 10 and the poor recording determination unit 11 for determining whether there is poor recording when recording on the recording medium 3.

The control unit 8 comprises a circuit composed of a micro processor unit (MPU) having a control function and an operation function, and a storage unit, such as, ROM, etc., storing a control program and the like, and non-volatile memory, which is not shown in FIG. 1, storing setting values for controlling devices and the like. The control unit 8 also realizes the above-described various controls by the MPU reading a prescribed control program from the storage unit and executing it.

When obtaining the input recording data 2 transmitted from a higher-level device in recording, the control unit 8 temporarily stores the data in its memory, which is not shown in FIG. 1. Then, it transfers the image data in the first line~the n-th line (n=integer of 2 or more) to the recording unit 7 and records it.

Next, each component of the poor recording detection device 1 is described with reference to FIG. 2.

The carrier unit 6 is disposed in such a way that the recording medium 3 moves in the sub-scanning direction by rotating a pair of carrier rollers 6a, and carries the recording medium 3 while maintaining the opposed relationship between the surface of the recording medium 3 and the camera unit 4. Then, the carrier unit 6 moves the recorded recording medium 3 to within the effective view range of the camera unit 4 and the illumination unit 5.

The four color recording heads 7-1 (black), 7-2 (cyan), 7-3 (magenta) and 7-4 (yellow) of the recording unit 7 are disposed on the upper stream side of the camera unit 4.
By such an arrangement, the recording state of the recording medium 3, immediately after the recording can be detected in real time. The control unit 8 can be disposed in an arbitrary position.

The irradiation range of the illumination unit 5 is arranged in such a way that the light receiving area of line sensor 4a in the camera unit 4 can cover the view of applied recording medium 3 and linearly applies light to the recording medium 3. The illumination unit 5 comprises a light source for linearly emitting light as a light source for illuminating a long range in which the amount of light is distributed linearly uniformly. For such a light source, although, for example, a fluorescent lamp can be used, light emitting diodes (LED) linearly arranged can be also used. When an LED is used, the device can be miniaturized.

Although a light source, such as infrared/ultraviolet rays, sun rays or the like can be also used according to the ink of the recording head, the reflective characteristic of the recording medium 3 and the like, in that case it is preferable to match the wavelength sensitivity characteristic of the line sensor of the camera unit 4 with the wavelength of the light source from the viewpoint of detection sensitivity. When it is necessary to shoot in a high speed in order to improve the carrying speed of the recording medium 3, a larger amount of light is necessary. In this case, the illumination unit 5 can also adopt, for example, a configuration in which a metal halide lamp is used as a light source, illumination light is led to the illumination unit 5 using an optical fiber and this illumination light is linearly applied to the recording medium 3.

A line sensor 4a using a charge-coupled device (CCD) and a complementary metal oxide semiconductor (CMOS) and a lens 4b are built in the camera unit 3. In this case, the pixel array of the line sensor 4a is disposed in such a way that the direction in which the array is projected on the surface of the recording medium 3 can be the main scanning direction. Therefore, the line sensor 4a can continuously read a bi-dimensional image recorded on the recording medium 3 carried by the carrier unit 6.

Instead of the line sensor 4a in the camera unit 4, bi-dimensionally arrayed area sensors can be also used. In that case, by using an illumination system of bi-dimensionally lighting the view field of the light receiving surface of the area sensor which is projected on the surface of the recording medium 3, the output of an encoder device disposed in the carrier unit 6 or the like, image information is intermittently obtained in a appropriate shooting timing according to the carrier speed. By setting each distance between the recording medium 3, the lens 4b and the line sensor 4a, a desired resolution according to the pitch of a pixel array and an optical scale factor can be obtained.

The camera unit 4 is disposed in such a way that the direction of the optical axis may be perpendicular to the surface of the recording medium 3 and the irradiation axis 5b of the illumination unit 5 (see FIG. 2) is disposed in such a way as to be, for example, 45 degrees against the surface of the recording medium 3 in a plane formed by the sub-scanning direction and a direction perpendicular to the surface of the recording medium 3. Since by such an arrangement, the regular reflection light of illumination light reflected on the surface of the recording medium 3 can be prevented from entering the camera unit 4, the camera unit 4 can shoot and pick up a good-contrast image.

The control unit 8 and the poor recording determination unit 11 are disposed physically away from the recoding unit 7, the carrier unit 6, the camera unit 4 and the illumination unit 5. The control unit 8 obtains the input recording data 2 transmitted from a higher-level device and compares it with image information outputted from the camera unit 4.

The poor recording detection device 1 continuously reads an image recorded on the recording medium 3 by the line sensor 4a on the basis of the input recording data 2 transmitted from a higher-level device and compares the obtained information with the input recording data 2 transmitted from a higher-level device. Then, on the basis of this comparison result, the poor recording detection device 1 detects poor recording in which ink is not appropriately discharged due to ink clogging, the poor operation of a nozzle or the like and poor fusion in which ink does not reach the target position on the recording medium 3.

Next, the correction method in poor recording detection by the poor recording detection device 1 is described with reference to FIGS. 1 and 3.

In the following description, image data transmitted from a higher-level device is indicated by the input recording data 2 as described above and input recording data being a fixed image recording pattern used at the time of calibration for correction is indicated by reference recording data, which are registered in advance in the above-described reference recording data memory 9.

The reference recording data recorded on the recording medium 3 is indicated by a reference recording image 3a, image data obtained by reading this recorded reference recording image 3a by the camera unit 4 is specified as reference detection information and a correction value obtained by comparing the reference recording data with the reference detection information is indicated by correction information. Furthermore, image data obtained by correcting the input recording data 2 by the correction information is indicated by corrected input recording data, an image recorded on the recording medium 3 on the basis of the input recording data 2 is indicated by an input recording image 3b and image data obtained by reading this input recording image 3b by the camera unit 4 is specified as input recording image information. Then, by comparing the corrected input recording data with the input recording image information by the poor recording detection unit 11, poor recording is detected.

This data has 24-bit data being the total of 8-bit data for each color of RGB. In this case, in the dot data of each color of RGB expressed by 8 bits, the lowest and highest gradation values are 0 and 255, respectively. In the recording medium 3 appropriately recorded on the basis of the input recording data, the gradation of recording dot corresponding to dot data whose gradation value is the lowest (that is, 0) is expressed to be black. In the recording medium 3 appropriately recorded on the basis of the input recording data 2, the gradation of recording dot corresponding to dot data whose gradation value is the highest (that is, 255) is expressed to be white.

However, when being appropriately recorded on the basis of the input recording data 2, the recording dot corresponding to dot data whose gradation value is the highest becomes a non-recording dot (dot in which ink drop to be fused into the recording medium 3 is not discharged). "Poor recording" includes not only a poor recorded image due to the dot missing of an image recorded on the recording medium 3 and poor gradation and the like but also a poor recording medium 3, such as poor preprint printed in advance on the recording medium 3, a broken or dirty recoding medium and the like.

The poor recording detection device 1 in this preferred embodiment is configured to detect poor recording in which ink is not appropriately discharged due to ink clogging, the poor operation of a nozzle and the like, poor fusion in which ink does not reach the target position on the recording medium 3 and partially poor recording medium 3 by continuously reading an image recorded on the recording medium 3 on the basis of the input recording data 2 by the line sensor 4a and comparing the obtained image information the input recording data 2 transmitted from a higher-level device.

Therefore, in order to accurately detect poor recording the high matching of the intra-plane positions and gradation values of corresponding dot data are necessary. However, actually there are the following various problems. For example, sometimes intervals between nozzle positions corresponding to each dot of the recording unit 7 are partially unequal and sometimes an image forming position on the line sensor 4a deviates and is fixed in the main scanning direction due to the aberration of a camera lens 4b. Sometimes density after recording does not becomes uniform in the main scanning direction due to the unevenness of the proper characteristic of a recording head, such as the unevenness of the amount of discharge, discharge condition of ink of the nozzle of each of the recording heads 7-1, 7-2, 7-3 and 7-4 and sometimes the reflectance of the recording medium 3 differs for each type of medium. Furthermore, sometimes the unevenness of illumination light and the decrease of the peripheral amount of light of the camera lens 4b occur and are fixed. Sometimes the position of the recording unit 7 deviates against the recording medium 3 and an image deviates and is recorded. Sometimes the recording medium 3 moves obliquely against the recording unit 7, and an image deviates obliquely and is recorded.

When the positions and gradation values of compared dot data is not matched due to these factors, the poor recording detection function deteriorates.

In order to remove these position and gradation errors, in this preferred embodiment, firstly, as shown in FIG. 1, the reference recording data having a pre-determined bi-dimensional array pattern and gradation information in the operation mode of calibration for correction, different from the normal printing operation is registered in the reference recording data memory in advance and the control unit 8 connects the reference recording data to the image correction unit 10 and recording unit 7 by a switch (SW01).

By such an operation, the reference recoding image 3a recorded on the recording medium 3 by the recording unit 7 is moved up to within the view field of the camera unit 4 by the carrier unit 6 and is detected as the reference detection information by the camera unit 4. At this time, the reference recording image 3a is picked up as reference detection information including the peculiar characteristic of the recording heads 7-1, 7-2, 7-3 and 7-4 of the image recording apparatus 30 and the errors of the peculiar position and gradation of the poor recording detection device 1 and is led to the image correction unit 10 by a switch (SW02).

By the above-described process, the reference recording data and the reference detection information gather in the image correction unit 10 and they are compared and operated by the operation unit 10a. The obtained difference between them is the correction information for position and gradation and is stored in the correction information memory 10b of the image correction unit 10.

Figure 3:
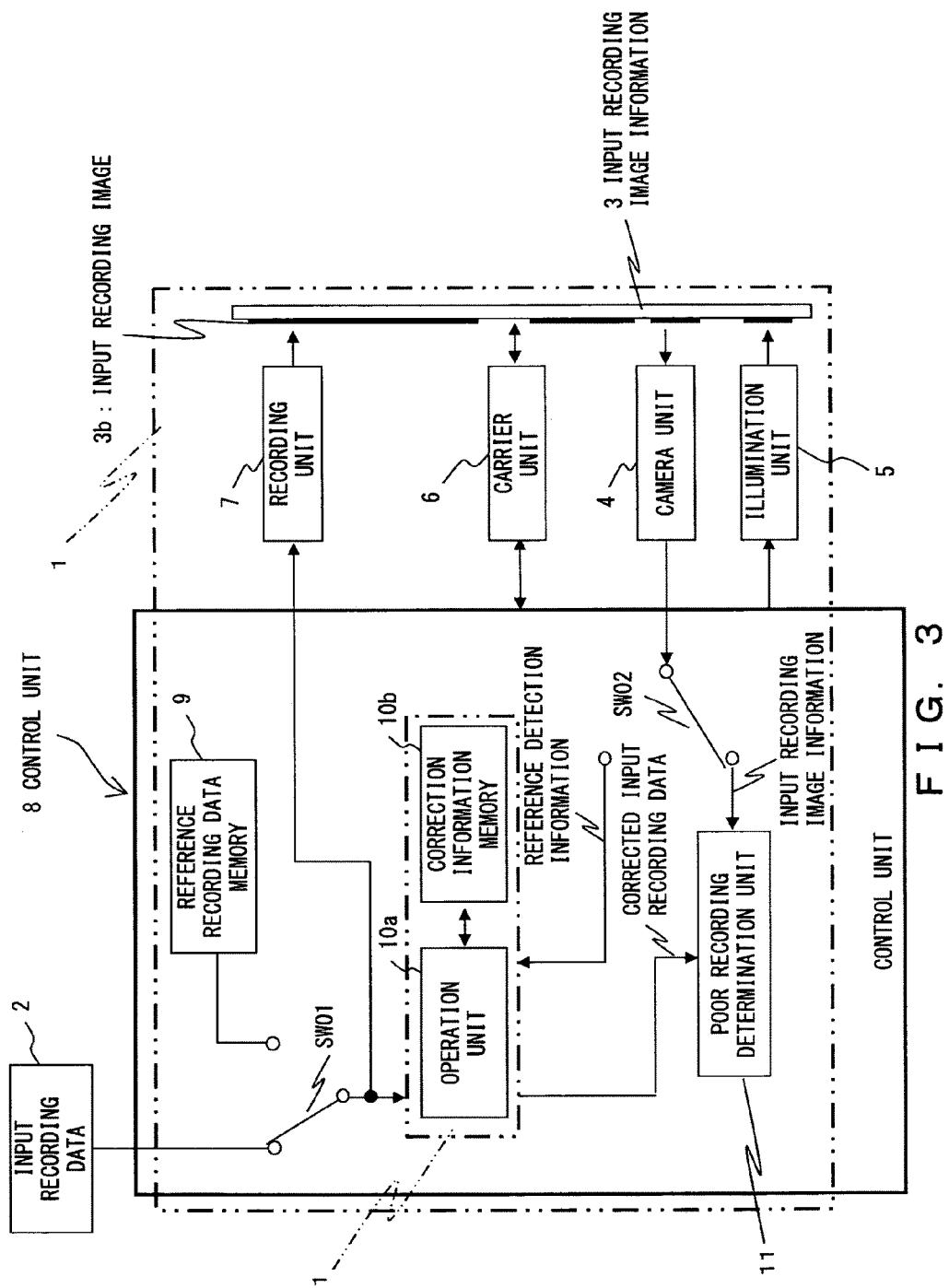
FIG. 3 shows the conceptual block configuration at the time of the normal recording operation of the poor recording detection device in the first preferred embodiment.

Then, the normal recording operation shown in FIG. 3 is performed. This recorded data selects the input recording data 2 by the change-over of the switch (SW01) and supplies it to the recording unit 7 and the image correction unit 10. The input recording image 3b recorded on the recording medium 3 by the recording unit 7 is moved up to within the view field of the camera unit 4 by the carrier unit 6 and is detected by the camera unit 4. At this time, the input recording image 3b is picked up as input recording image information including the errors of the peculiar position and gradation of the poor recording detection device 1 and is connected to the poor recording determination unit 11 by the change-over of the switch (SW02).

The other input recording data 2 connected to the image correction unit 10 by the switch (SW01) calls up the correction information obtained in advance when calibrating from the correction information memory 10b in the image correction unit 10 and adds the correction information to the input recording data 2.

By this process, the input recording data 2 becomes corrected input recording data being data including the errors of the peculiar position and gradation of the poor recording detection device 11 and becomes reference data used for the comparison process in the poor recording determination unit 11.

By the above-described process, data necessary for determination gathers in the input unit of the poor recording detection device 11 and the poor recording caused when recording the input recording data 2 can be detected by obtaining the difference between the corrected input recording data and the input recording image information in the poor recording detection device 11.

Since the above-described configuration presumes handling the input recording data by the RGB 24 bits, the other units also presume a configuration corresponding to color. For example, the recording unit 7 performs color conversion in order to record RGB color information by a head corresponding to CMYK ink, the camera unit 4 detects the input recording image 3b in RGB by detecting the received amount of light after transmitting the input recording data 2 through each color filter of RGB by the line sensor 4a and further all the units included in the control unit 8 perform processes corresponding to the 3 channels of RGB. For example, the image correction unit 10 performs dot position correction, gradation correction and the like.

The poor recording determination unit 11 can specify the poor dot of each recording head of CMYK by converting RGB into CMYK again. If monochrome recording is presumed, it is sufficient for the above-described units to take a one-channel configuration. Therefore, the system can be simplified.

Here, the procedure of obtaining correction information on the basis of the reference recording data in the calibrating operation of the configuration shown in FIG. 1 and adding position correction information to the input recording data to generate corrected input recording data in the normal recording operation of the configuration shown in FIG. 3 is described with reference to FIG. 4. In FIG. 4, the main and sub scanning directions are intra-paper surface rightward and downward directions, respectively.

Firstly, in FIG. 4A, one dot corresponds to one black circle, for example, in the recording density of 300 dpi assuming the reference recording data being the reference for calibration to be a four-row four-column bi-dimensional image matrix. In this case, the recording density of the nozzle array of the recording head is also 300 dpi. The position of a black circle indicates the position of a dot to be recorded and corresponds to each nozzle position of the recording head, linearly arrayed in the main scanning direction. Although each dot also includes color and gradation information, only position information is shown in FIG. 4 for the purpose of simplification.

Each nozzle of the recording head is on/off-controlled in time sequence to record the reference recording data on the recording medium which moves in the sub scanning direction on the basis of its dots in the sub scanning direction.

FIG. 4B bi-dimensionally shows data detected as reference detection information by the camera unit 4 after the reference recording data is recorded on the recording medium 3. The space resolution of the camera unit 4 is, for example, 600 dpi being the double of the above-described recording density of 300 dpi. A dot (3, 2) on the third row in the sub scanning direction and on the second column in the main scanning direction shown in FIG. 4A is detected as a dot (5, 2) in FIG. 4B. Similarly, dots (4, 2), (1, 3) and (2, 3) shown in FIG. 4A are detected as (7, 2), (1, 6) and (3, 6), respectively, in FIG. 4B.

This is, for example, because the reference recording data deviates by half of one dot pitch, that is, one pixel pitch of the line sensor 4a deviates if the line sensor 4a has resolution of 600 dpi due to the positional deviation initially owned by the recording head. FIG. C shows correction information obtained by mapping the direction and size of this deviation in the main scanning direction in relation to the array of the reference recording data, for example, assuming the left side, the right side and one dot pitch corresponding to 600 dpi as minus (−), plus (+) and 1, respectively, by comparing and operating the reference recording data and reference detection information. A dot which does not deviate is indicated by 0.

FIG. 4D shows the correction information string of the position deviation information compressed in the sub scanning direction since it has one value for each nozzle. This correction information string is stored in the correction information memory 10b of the image correction unit 10 shown in FIG. 1.

Next, the process of generating the corrected input recording data by adding the correction information to the input recording data 2 in the normal recording operation in the configuration shown in FIG. 3 is described. In normal recording operation, the position information of the input recording data shown in FIG. 4E is mapped in advance with 600 dpi being the same space resolution as the camera unit 4 and the correction information and the corrected input recording data shown in FIG. 4G can be obtained by adding the correction information string shown in FIG. 4D stored in the correction information memory 10b of the image correction unit 10 shown in FIG. 1, as shown in FIG. 4F.

By this process, the input recording data 2 becomes corrected input recording data being data including the peculiar position error of the poor recording detection device 1 and becomes reference data used in the comparison of the poor recording determination unit 11.

Then, as described above, by calculating the difference between the corrected input recording data and the input recording information in the poor recording determination unit 11, poor recording caused when recording the input recording data can be detected.

By the above-described configuration, for example, as shown in a string to be corrected shown in FIG. 4H, when a nozzle in the second column of the main scanning direction does not discharge to cause dot missing, by comparing the corrected input recording data shown in FIG. 4G with the input recording image information shown in FIG. 4H in the poor recording determination unit 11, the poor recording of each dot is checked in the order of T, F, T and T along the main scanning direction as shown in FIG. 4I poor recording check (to be corrected) and it is correctly determined that only the nozzle in the second column of the main scanning direction. In this case, T and F indicate a dot with no poor recording and a dot with poor recording. In FIGS. 4G and 4H, the positions in the main scanning direction of a nozzle string for four columns in this example are related by resolution for eight columns.

However, when the poor recording is detected without adding correction information to the input recording data 2, the poor recording of each dot is checked in the order of T, F, F and T along the main scanning direction as shown in FIG. 4J poor recording check (no need to correct) since the input recording data in shown in FIG. 4E is compared with the input recording image information shown in FIG. H, and essential dot missing cannot be detected. Furthermore, a dot without dot missing in the third column is wrongly detected.

Next, the procedure of calculating correction information on the basis of the reference recording data in the calibrating operation of the configuration shown in FIG. 1 and generating corrected input recording data by adding gradation correction information to the input recording data 2 in the normal recording operation is described with reference to FIG. 5.

FIG. 5 is a graph showing the co-relationship between the gradation information of reference recording data and the gradation value of reference detection information detected by the camera unit 4 after recording the reference recording data on the recording medium taking the former and the latter for the X and Y axes, respectively. The gradation value of the reference recording data does not always coincide with the gradation value of the reference recording image information due to the characteristics of the recording heads 7-1, 7-2, 7-3 and 7-4, the peculiar characteristic of the poor recording detection device 1, the characteristic of used ink, the characteristics of the color, reflectance and the like of the recording medium 3, and has, for example, co-relation characteristic expressed by $Y=f(X)$.

In this example, for example, the recording medium 3 is not completely white and light color is attached to white. A characteristic that proportional dark gradation cannot be obtained due to blur as recording with high density is shown. As to a nozzle, one characteristic shown in FIG. 5 is given to each dot of the linear array corresponding to each nozzle string of the recording head in advance. A correction information string is a data string with the same resolution of 600 dpi as in FIG. 4D. By adding this correction information string to the input recording data and applying the operation of $Y=f(X)$ to the input recording data as in the above-described position deviation correction, corrected input recording data being data corrected by the peculiar gradation error of the poor recording detection unit 1 and the like and by calculating a difference in gradation between the corrected input recording data and the input recording image information in the poor recording determination unit 11, poor recording caused when recording the input recording data can be detected.

Furthermore, only gradation correction can be performed without performing the above-described nozzle position correction. In this case, it is sufficient to make only a value for gradation correction of the correction information calculated in the image correction unit 10 by comparing the reference recording data with the reference detection information in the calibrating operation valid and to compulsorily input 0 to a memory unit for nozzle position, that is, not to perform nozzle position correction.

Thus, by selectively using the position and gradation portions of the correction information, not only poor recording due to the discharge/non-discharge of each nozzle can be accurately detected, but also a poorly recorded image can be detected and image quality can be evaluated comprehensively.

Next, FIG. 6A shows an example of the image pattern of the reference recording data shown in FIG. 1. This image pattern is provided for each color (four colors in this preferred embodiment). The image range 20 of the reference recording data are provided with a recording area 21 composed of an area from patterns 21-1 to 21-8 in eight steps obtained by dividing 0 to 255 gradation and a portion 21-9 corresponding to each nozzle of the recording head.

Figure 6B:
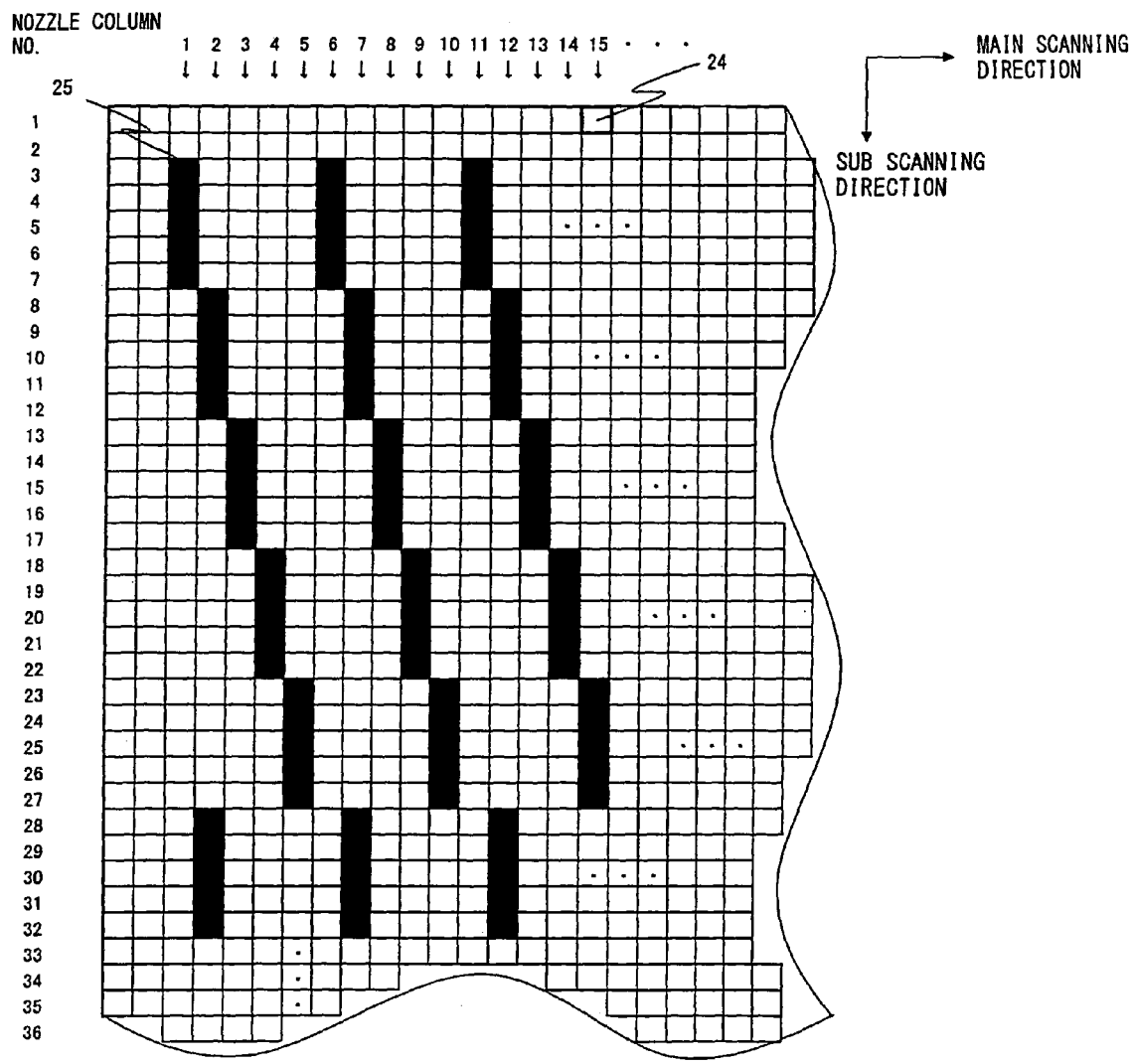
FIG. 6B shows an enlarged image pattern gradation information portion of the reference recording data.

By detecting the gradation values of the area from 21-1 until 21-8 using the camera unit 4 and relating them to the gradation values of the reference recording data, the gradation correction characteristic shown in FIG. 5 can be easily obtained. The length 22 in the main scanning direction of the recording area 21 is made longer than the length in the main scanning direction of the recording head, FIG. 6B shows the enlarged drawing of the portion 21-9 shown in FIG. 6A. In FIG. 6B, the intra-paper rightward and downward sides are the main and sub scanning directions, respectively. For example, one pixel 24 corresponding to one dot of the reference recording data corresponds to the nozzle column No. 15 of the recording head and this nozzle column records the 23-th to 27-th dots in the sub scanning direction.

Numerical reference 25 indicates the print area of the nozzle string 1 from the third dot until the seventh dot in the sub scanning direction. In this dot pattern, for example, a section of the third–seventh dots in the sub scanning direction is printed every five columns that is, in nozzle columns 1, 6, 11 . . . and their adjacent nozzles do not print simultaneously.

By arraying recorded data dots thus, interference between adjacent nozzles due to blur and the resolution shortage of the camera system, caused when recording in the comparison/operation process after detection can be reduced and a position error can be easily detected in the comparison/operation with the reference recording data in the image correction unit 10 after detecting the reference recording data as reference detection information in the camera unit 4 after recoding the reference recording data on the recording medium 3.

Figure 7:
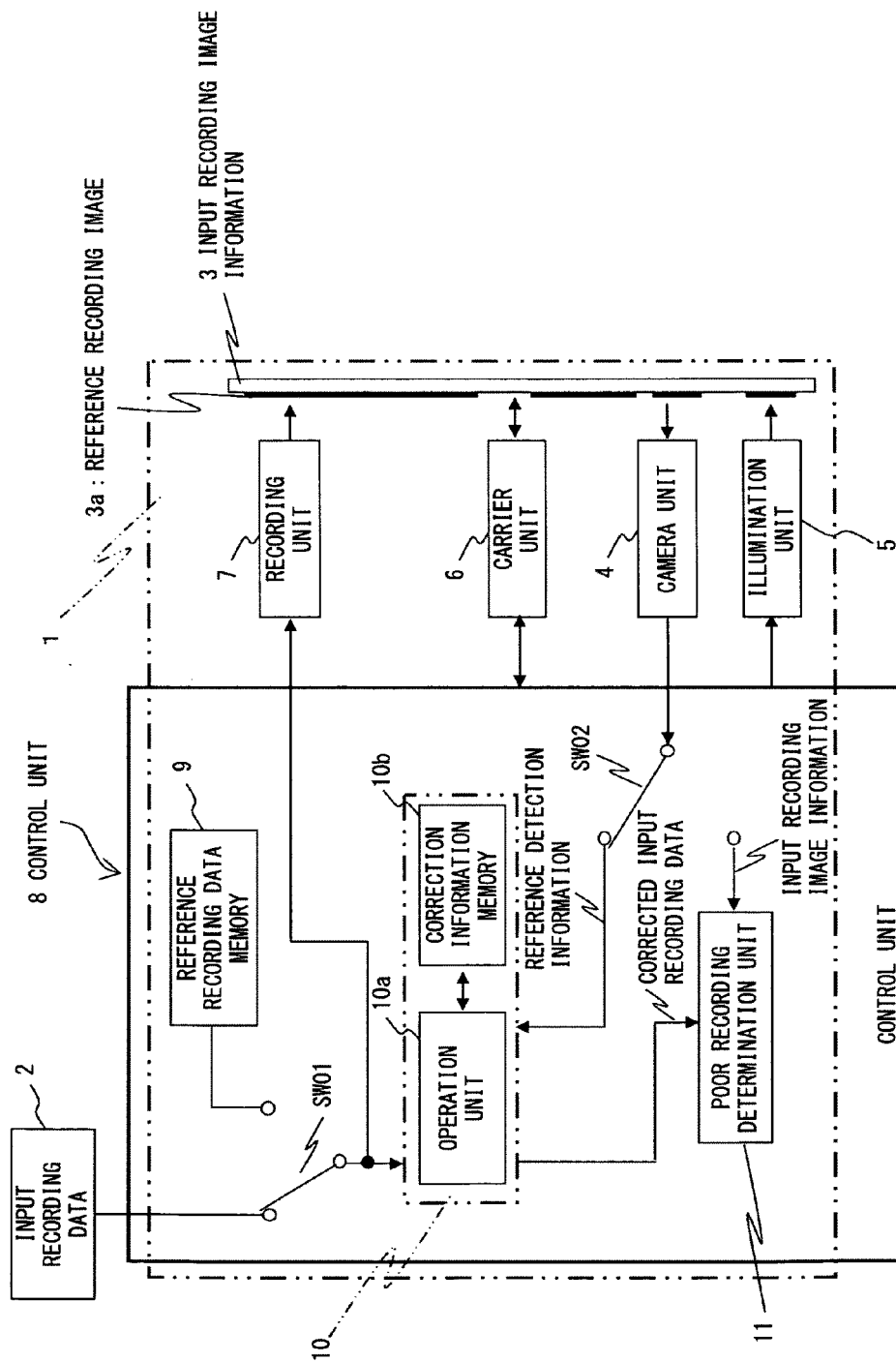
FIG. 7 shows the conceptual block configuration at the time of the calibrating operation of the poor recording detection device in a variation of the first preferred embodiment.

FIG. 7 shows a variation of the above-described first preferred embodiment, which is configured to use the input recording data 2 transmitted from a higher-level as the reference recording data when calibrating. For this recording data, the pattern shown in FIG. 6 can be used. Alternatively, another pattern can be used as long as a dot position in the main scanning direction and a gradation characteristic can be obtained and there is no problem if it is provided in the input recording data instead of inside the poor recording The input recording data used when normally recording can be also used as the reference recording data. For the configuration at the time of the normal recording operation in this variation, the same configuration shown in FIG. 1 as described above can be used. For the correction information, both or one of the above-described position correction information and the gradation correction information can be used.

As described above, according to the first preferred embodiment, since there is no need to correct for each page, a poor recording detection device capable of printing in a high speed and accurately detecting without being affected by the printing position deviation and gradation error initially owned by a printer can be provided.

The pixel pitch of the line sensor 4a for reading a recorded image can be the double of the dot pitch of the recorded image and the dot position can be accurately detected. Therefore, the degree of matching of the intra-plane position and gradation of corresponding dot data can be improved to accurately detect poor recording.

Furthermore, the pixel pitch of the line sensor 4a is not limited to the double of the dot pitch of an image to be recorded and it can be more than it or equal to it. In the case position correction for each dot or gradation correction is not needed, the pixel pitch of the line sensor 4a can also be less than the dot pitch of the recorded image.

In the case the reference detection information of all the dots is not necessary, there is no need for the line sensor 4a to be equal to or wider than the recording width recorded on the recording medium 3 and it is sufficient if its necessary portion is be equal to or wider than the recorded recording width. In this case, for example, a calibration pattern can be provided only in the four corners of the recording range of the recording medium 3, only these portions can be read and the color of the recording medium 3, position deviation between the recording unit 7 and the recording medium 3 and the like can be detected and corrected.

Next, the second preferred embodiment of the poor recording detection device of the present invention is described. In the description of the second preferred embodiment, the same numerical references are attached to the same components as the above-described first preferred embodiment and their description of the same functions and effects as the first preferred embodiment are omitted.

As to the second preferred embodiment, the procedure of obtaining correction information after weighting the reference detection information detected from the reference recording data by high resolution, according to its density value in the calibrating operation shown in FIG. 1 of the above-described first preferred embodiment and generating corrected input recording data by adding position correction information to the input recording data in the normal recording operation of the above-described configuration shown in FIG. 3 is described with reference to FIG. 8. In FIG. 8, the main and sub scanning directions are intra-paper surface rightward and downward directions, respectively. In FIG. 8, numerical numbers attached to each pixel indicate density values, and white and black are indicated by 0 and 255, respectively.

Firstly, in FIG. 8A, as in FIG. 4A, one dot corresponds to one black circle, for example, in the recording density of 300 dpi assuming the reference recording data being the reference for calibration to be a four-row four-column bi-dimensional image matrix. In this case, the recording density of the nozzle array of the recording head is also 300 dpi. The position of a black circle indicates the position of a dot to be recorded and corresponds to each nozzle position of the recording head, linearly arrayed in the main scanning direction. Although each dot also includes color and gradation information, only position information is shown in FIG. 8 for the purpose of simplification.

Each nozzle of the recording head is on/off-controlled in time sequence to record the reference recording data on the recording medium which moves in the sub scanning direction on the basis of its dots in the sub scanning direction.

FIG. 8B bi-dimensionally shows data detected as reference detection information by the camera unit 4 after the reference recording data is recorded on the recording medium 3. The space resolution of the camera unit 4 is, for example, 600 dpi being the double of the above-described recording density of 300 dpi. For example, a dot (3, 4) in the third row of the sub scanning direction and in the fourth column of the main scanning direction shown in FIG. 8A is detected as a dot between pixels (5, 7) and (5, 8) in FIG. 8B and the density value ratio between the pixels are 0.7 to 0.3.

This shows a state where the reference recording data deviates by a distance shorter than one dot pitch, for example, due to the discharge deviation of each nozzle initially owned by the recording head. Then, by comparing the reference recording data with the reference detection information and operating its difference in the above-described image correction unit 10, the directions and sizes of this deviation in the main and sub scanning directions are obtained. For example, the correction information shown in FIG. 8C shows values obtained by normalizing a density value corresponding to each dot in the range of adjacent pixels. A dot with no deviation is indicated by 1.

FIG. 8D shows a correction information string obtained by compressing position deviation information in the sub scanning direction since the number of values of the position deviation information is one for each nozzle. This correction information string is stored in the correction information memory 10b of the above-described image correction unit 10 shown in FIG. 1. In this example, each string takes the average of density values after normalizing in the sub scanning direction. If the dispersion of the density values in the sub scanning direction is large and periodic, the correction information can be also treated bi-dimensionally instead of linearly as described later.

Next, the process of generating corrected input recording data by adding correction information to the input recording data 2 when normally recording in the configuration shown in FIG. 3 is described. When normally recording, by mapping the position information of the input recording data shown in FIG. 8E in advance with 600 dpi being the same space resolution as the camera unit 4 and the correction information and multiplying the correction information string shown in FIG. 8D which is stored in the correction information memory 10b of the image correction unit 10 shown in FIG. 1, as shown in FIG. 8F, the corrected input recording data shown in FIG. 8G can be obtained. For example, the value of a pixel (7, 7) shown in FIG. 8G becomes 131, which is obtained by multiplying 187 being the value of the pixel (7, 7) shown in FIG. 8E by 0.7 of the correction information string shown in FIG. 8D.

By this process, the input recording data 2 becomes corrected input recording data being data including the peculiar position error of the poor recording detection device 1 and becomes reference data used for comparison in the poor recording determination unit 11.

Then, in the poor recording determination unit 11, the nozzle missing check threshold shown in FIG. 8H is generated. Although in this example, a value obtained by multiplying each pixel value of the corrected input recording data shown in FIG. 8G by 0.5 is the check threshold, this value can be arbitrarily set taking into consideration a detection ratio and a printing system. Then, by comparing the size relationship between the nozzle missing check threshold and the input recording image information, poor recording caused when recording the input recording data can be detected. In this example, it is determined that the nozzle in the second column is missing.

By the above-described configuration, for example, when dot missing occurs due to the missing of the nozzle in the second column of the main scanning direction, as shown in a string to be corrected of FIG. 8H, by comparing the nozzle missing check threshold shown in FIG. 8H with the input recording image information shown in FIG. 8I in the poor recording determination unit 11, the poor recording of each dot is checked in the order T, F, T and T along the main scanning direction as shown in poor recording check of FIG. 8J and it is correctly determined that only the nozzle in the second column of the main scanning direction is missing. T and F indicate dots with poor recording and without poor recording, respectively. In FIGS. 8H and 8I, the position in the main scanning direction of nozzle strings for four columns in this example are related with resolution for eight columns.

However, when detecting poor recording without adding correction information to the input recording data 2, since the input recording data shown in FIG. 8E is compared with the input recording image information shown in FIG. 8I, the poor recording of each dot is checked in the order of T, F, F and T along the main scanning direction, as shown in poor recording determination (not to be corrected) of FIG. 8K and it is wrongly determined the dots in the third and fourth columns without nozzle missing were missing.

Instead of operating a density value in order to obtain FIG. 8G, the average of those of adjacent pixels when obtaining the correction information shown in FIG. 8C can be also calculated, a pixel with the highest density can be also selected or a correction value can be also calculated by calculating gravity on the basis of the position and density value of each pixel. Thus, by obtaining reference detection information with higher density than the dot density of the recording head and checking nozzle missing using correction information obtained according to the brightness information of each pixel, more accurate nozzle missing check than a nozzle pitch can be realized.

In order to more accurately detect dot position deviation due to the mis-direction of the recording head, the discharge timing fixed error of the head, the control error of a carrier system, the uneven fixed carrier speed against page starting timing, the mechanical eccentricity and shape error of a carrier system, which are peculiar to the image recording apparatus, it is sufficient to multiply FIG. 8C being the correction information of a bi-dimensional array whose area is formed in arbitrary units to each pixel corresponding to the input recording data instead of multiplying it by a linear correction information string when multiplying in FIG. 8F. If the load of a processing system and a memory access system is increased by using bi-dimensional correction information, it is sufficient to switch over to linear correction arbitrarily.

Figure 9:
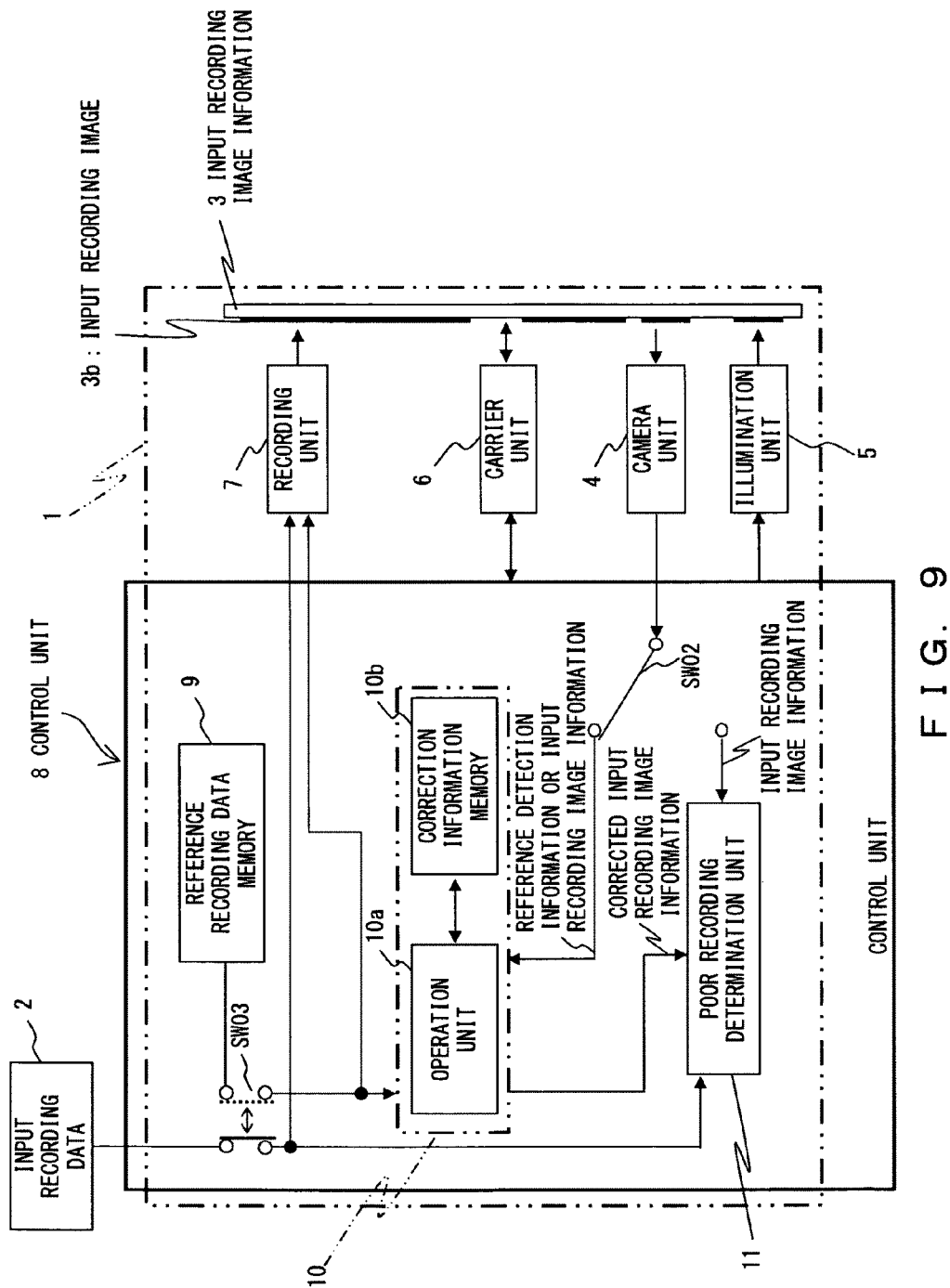
FIG. 9 shows the conceptual block configuration at the time of the calibrating operation of the poor recording detection device in the second preferred embodiment.
Figure 10:
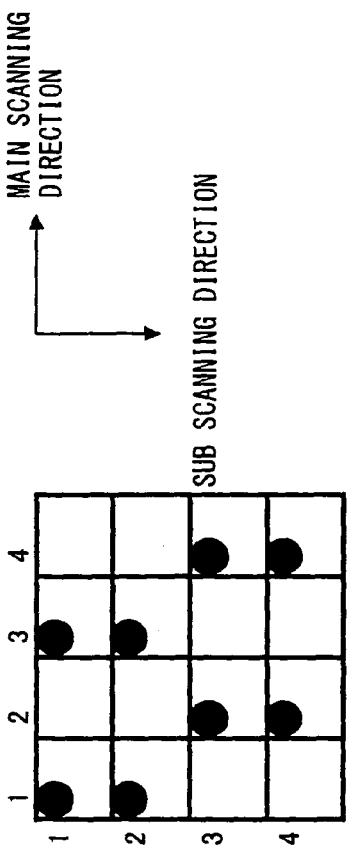
FIG. 10A shows one example of the reference recording data being the reference for calibration.
FIG. 10B bi-dimensionally shows data detected as reference detected information by the camera unit after recording reference recording data on a recording medium.
FIG. 10C shows one example of correction information.
FIG. 10D shows one example of a correction information string.
FIG. 10E shows one example of input recording data.
FIG. 10F shows one example of a correction information string.
FIG. 10G shows one example of corrected input recording data.
FIG. 10H shows one example of input recording image information.
FIG. 10I shows one example of a nozzle missing determination threshold.
FIG. 10J shows a poor determination result obtained when performing this correction process.
FIG. 10K shows a poor determination result obtained when not performing this correction process.

Next, a variation of the above-described second preferred embodiment is described with reference to FIGS. 9 and 10. FIG. 9 shows the conceptual block configuration of the poor recording detection device in a variation of the second preferred embodiment of the present invention and shows its calibrating operation. FIG. 10 shows its normal recording operation. FIG. 9 differs from FIG. 1 in that SW03 is provided as the route change-over switch of the input recording data 2 instead of SW01 and that SW02 is always connected to the block of the operation unit 10a and the correction information memory 10b.

As to its operation, firstly, when calibrating, SW03 switches over to the state indicated by a broken line to make the flow of a signal the same as in FIG. 1. At this time, the correction information is stored in the correction information memory 10b as in the first preferred embodiment.

Then, when normally recording, SW03 switches over to the state indicated by a solid line to transmit the input recording data to the recording unit 7 and also transmits it to the poor recording determination unit 11 directly without passing it through the operation unit 10a. In the poor recording determination unit 11, the other information to be compared is read by the camera unit 4 after the input recording data 2 is recorded on the recording medium 3 and is transmitted to the operation unit 10a as input recording image information via SW02. Then, after operating it on the basis of the correction information stored in the correction information memory 10*b* when calibrating, it is transmitted to the poor recording determination unit 11 as corrected input recording image information, and is compared with the above-described input recording data 2 and is checked. Although in the second preferred embodiment, the correction information is added to the input recording data 2 and is operated, in this variation, the correction information is added to the input recording image information and is operated.

Then, the procedure of obtaining correction information on the basis of the reference recording data when calibrating in the configuration shown in FIG. 8 and generating corrected input recording image information by adding position correction information to the input recording image information when normally recording in the configuration shown in FIG. 9 is described with reference to FIG. 10.

FIG. 10 differs from FIG. 8 in that FIG. 10E is input recording image information instead of input recording data and that the operation in FIG. 10F is division instead of multiplication. The difference in comparison/determination between the cases with correction and without correction and their effects are the same as in FIG. 8.

By adding correction information to the input recording image information and operating them thus, the processing system can be sometimes simplified. For example, this is a case where the resolution of the input recording data 2 and that of the camera unit 4 are 300 dpi and 600 dpi, respectively. In such a case, since if the 300 dpi of the input recording data 2 is made 600 dpi, the amount of information tends to increase, the load of the processing system increases. Therefore, it is easier to generate 300 dpi reference recording data from 600 dpi camera image data. In this case, it is sufficient to perform optimization, such as making a density value weighted on the basis of the gravity position from each 600 dpi adjacent center pixel the density value of corresponding 300 dpi pixel, taking the average of those of 600 dpi pixels, selecting that of one of the pixels or the like according to its detection accuracy.

As described above, according to the above-described second preferred embodiment, since there is no need to correct for each page, a poor recording detection device capable of printing in a high speed and accurately detecting without being affected by the printing position deviation and gradation error initially owned by a printer can be provided.

By making the pixel pitch of the line sensor 4*a* for reading recorded imaged the double of the dot pitch of an image to be recorded, a dot position can be more accurately detected. Therefore, the degree of coincidence of the intra-plane position and gradation values of corresponding dot data can be improved and poor recording can be more accurately detected.

Furthermore, the pixel pitch of the line sensor 4*a* is not limited to the double of the dot pitch of an image to be recorded and it can be more than it or equal to it. In the case position correction for each dot or gradation correction is not needed, the pixel pitch of the line sensor 4*a* can also be less than the dot pitch of the recorded image.

In the case the reference detection information of all the dots is not necessary, there is no need for the line sensor 4*a* to be equal to or wider than the recording width recorded on the recording medium 3 and it is sufficient if its necessary portion is be equal to or wider than the recorded recording width. In this case, for example, a calibration pattern can be provided only in the four corners of the recording range of the recording medium 3, only these portions can be read and the color of the recording medium 3, position deviation between the recording unit 7 and the recording medium 3 and the like can be detected and corrected.

Next, the third preferred embodiment of the poor recording detection device of the present invention is described. In the description of the third preferred embodiment, the same numerical references are attached to the same components as the first and second preferred embodiments and their description of the same functions and effects as the first and second preferred embodiments are omitted.

Figure 12:
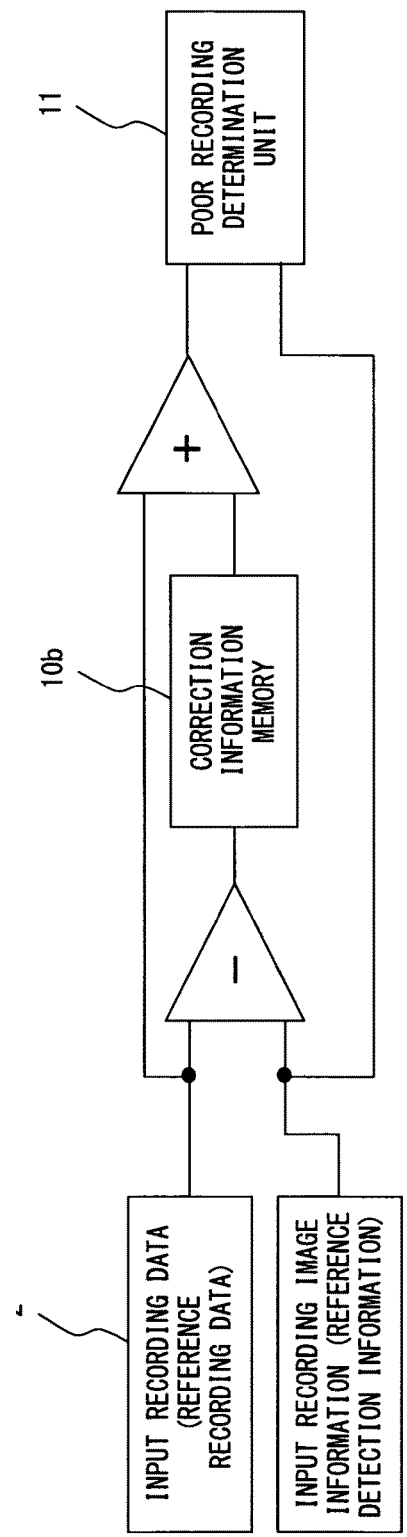
FIG. 12 shows the conceptual block configuration of the image correction unit in the poor recording detection device in the third preferred embodiment.

FIG. 11 shows the conceptual block configuration of the poor recording detection device in the third preferred embodiment. FIG. 12 is the detailed block diagram of the image correction unit 10 in the poor recording detection device in the third preferred embodiment.

The third preferred embodiment shown in FIG. 11 is characterized in not having the calibration process as shown in FIGS. 1 and 7 and correcting in real time when normally recording. As to its means, the switch (SW01) shown in FIG. 11 always selects the input recording data 2 to input it to the image correction unit 10 and the input recording image information obtained by detecting the input recording image 3*b* which is obtained by recording the input recording data 2 on the recording medium 3, by the camera unit 4 is always connected to both the image correction unit 10 and the poor recording determination unit 11 by a switch (SW02).

By such a connection, since detection is performed at the state where correction information is always added to the input recording data 2, by the poor recording determination unit 11, as shown in FIG. 12, there is no need to switch between calibration and normal recording operations timewise, and the print position deviation and gradation error initially owned by the image recording apparatus are corrected by a specific time constant, thereby enabling accurate detection in real time.

At this time, for a method for detecting without being affected by the spatial interference of surrounding dots in order to extract the nozzle position and gradation information from the input recording data 2 as the reference recording data, area division by a threshold process and feature amount extraction by a template method can be used. Hereinafter, they are described with reference to FIGS. 13 and 14.

Figure 13:
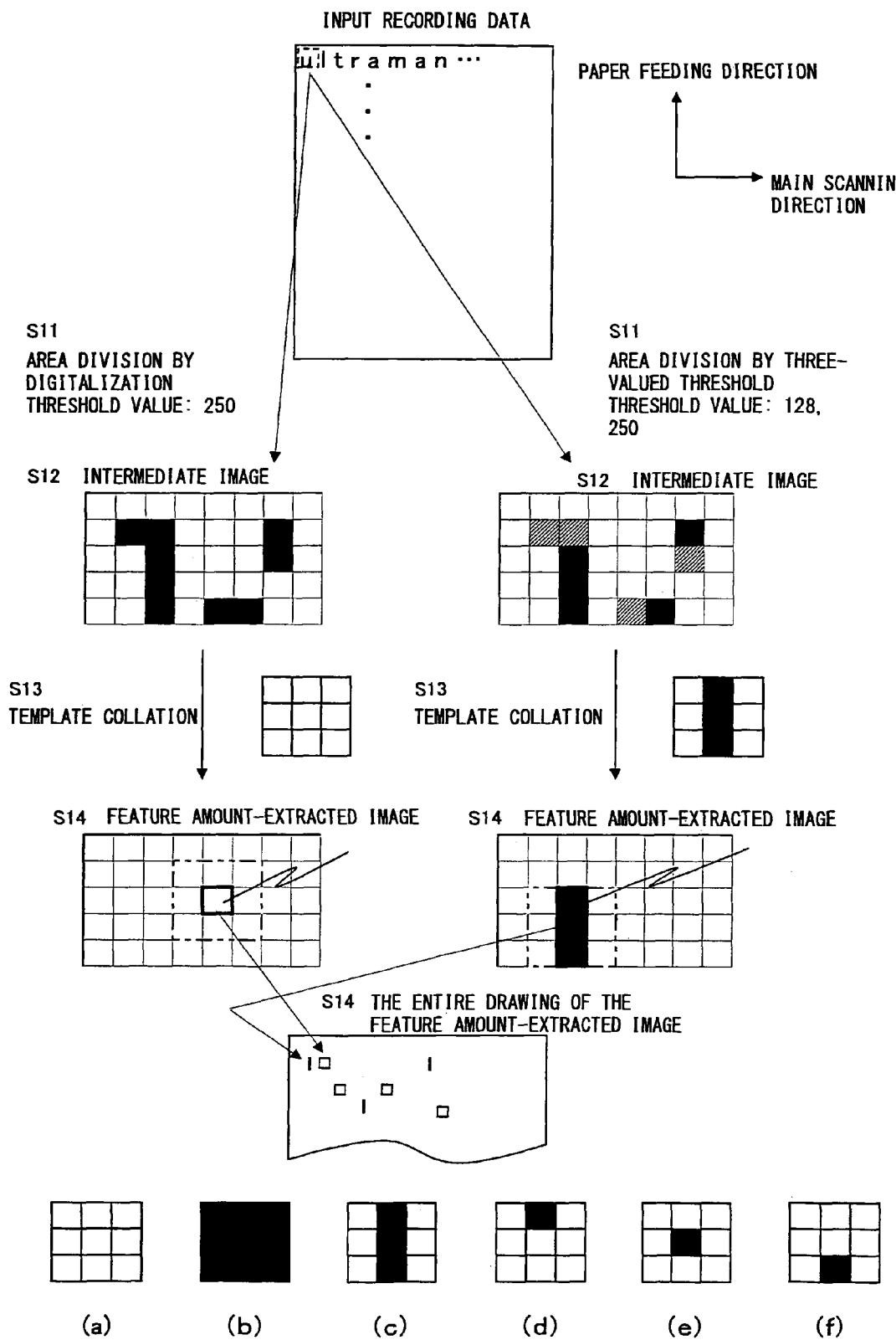
FIG. 13 shows the method for extracting reference recording data from input recording data, of the image correction unit in the poor recording detection device in the third preferred embodiment.
Figure 14:
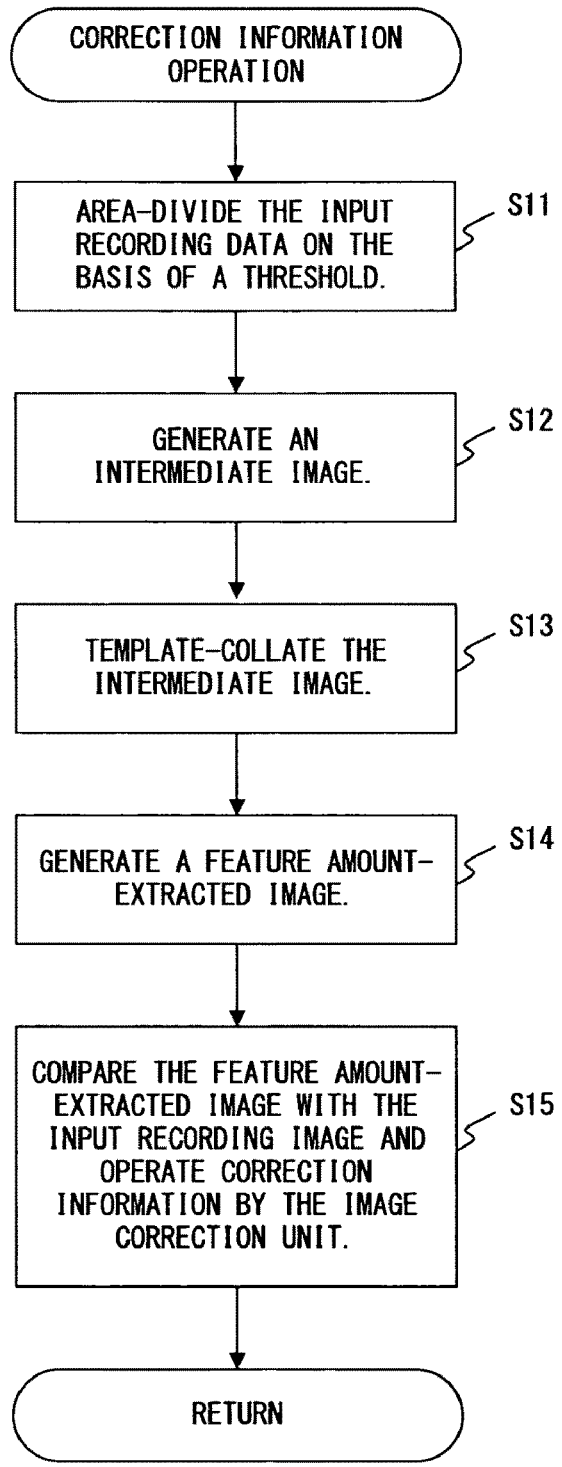
FIG. 14 is a flowchart for extracting reference recording data from input recording data, of the image correction unit in the poor recording detection device in the third preferred embodiment.

For example, in the case where the white-level gradation of 255 of the RGB 24-bit input recording data is corrected, in S11 shown in FIG. 14 the input recording data is one piece after another, for example, by converting dots of 250 or more and those of less than 250 into 255 and 0, respectively, with 250 as its threshold and in step S12 a white and black intermediate image in two gradation as shown in FIG. 13 is temporarily generated. It is because the probability of extracting dots which become the reference recording data in the allowable range of a gradation correction error is improved that the threshold is 250 instead of 255.

Then, in step S13, the intermediate image is collated, for example, using a 3×3 template with 3 dots in each of the main and sub scanning directions. For this template, a pattern in which a gradation value of 255 is inputted to all of the 9 dots is used in order to extract white portions as shown in FIG. 13A.

By this, in step S14, a feature amount-extracted image composed of dot areas with the amount of feature in which all the 3×3 dot areas are 255 gradation can be obtained. A dot extracted as the reference recording data used for gradation correction in this obtained white dot area can prevent correction accuracy from deteriorating due to ink blur from surrounding dots, the interference of adjacent dots due to the resolution shortage of a camera system and the like by making it one center dot.

After the input recording data before extraction is recorded on the recording medium 3, the linearly-arrayed correction information shown in FIG. 4D can be obtained by comparing the dots of the feature amount-extracted image thus obtained with dots matched with the packed-up input recording information in the main scanning direction and poor recording is detected one after another by transmitting the corrected input data gradation-corrected by this to the poor recording determination unit 11.

Although immediately after correction, correction information being a linear array is only dispersedly embedded, by repeating the process one after another at the almost the same speed as carrier speed, the number of arrays in which correction information is embedded can be increased and the number of gradation-corrected dots increases as time elapses. Thus, poor recording is detected during its actual operation while gradation is corrected.

In the case where black-level gradation of 0 of the input recording data is corrected, in step shown in FIG. 14 the input recording data is digitalized one piece after another, for example, by converting dots of 5 or more and those of less than 5 into 255 and 0, respectively, with 5 as its threshold a white and black intermediate image in two gradation as shown in FIG. 13 is temporarily generated.

After that, the process is performed in the same procedure as the white-level gradation correction. However, for the template, a pattern in which 0 is inputted to all of the 9 dots is used in order to extract black portions as shown in FIG. 13B.

Furthermore, a plurality of intermediate gradation levels can be extracted in the same procedure by making the threshold and a gradation value inputted to the template intermediate gradation, thereby correcting a non-linear gradation characteristic.

Next, the case of correcting the nozzle position of the recording head is described. It flowchart is the same as that of gradation correction shown in FIG. 14. A dot pattern to be extracted from the input recording data as the reference recording data is one whose gradation close to black as much as possible and whose width is one dot, as shown by 25 in FIG. 6B since it requires position information in units of one nozzle. Since its width is one dot and thin and it is easily affected by the resolution of the camera system, position correction errors can be reduced if two thresholds are set and is three-valued when dividing the area by the threshold. Therefore, it is effective.

In the example shown in FIG. 13, in step 11 the three-valued threshold is set to 128 and 250. Thus, the input recording data is three-valued one after another by replacing dots with gradation values of 250 or more, dots of 128 or more to less than 250 and dots less than 128 with those of 255, 128 and 0, respectively, and in step S12 an intermediate image in three gradation is temporarily generated.

Then, although in step S13 the intermediate image is collated using a 3×3 template of 3 dots as in the gradation correction, in this case the pattern shown in FIG. 13C, in which 0 for extracting black and 255 for extracting white are inputted and arrayed in the center of the main scanning direction and at its each end, is used. By using this pattern, correction accuracy can be prevented from deteriorating due to ink blur from surrounding dots, the interference of adjacent dots due to the resolution shortage of the camera system and the like.

In order to eliminate dots in 128 gradation between white and black, set in the three-valuing, it is designed that only gradation values of 0 and 255 are inputted to the pattern. Although the extraction ratio obtained when using this pattern sometimes low depending on the contents of the input recording data, in that case the patterns shown in FIGS. D, E and F can be also prepared in advance, and can be also used according depending ob the extraction ratio.

As in the gradation correction, after the input recording data before extraction is recorded on the recording medium 3, the linearly-arrayed correction information shown in FIG. 4D can be obtained by comparing the dots of the feature amount-extracted image obtained thus with dots matched with the packed-up input recording information in the main scanning direction and poor recording is detected one after another by transmitting the corrected input data gradation-corrected by this to the poor recording determination unit 11.

As described above, according to the third preferred embodiment, there is no need to switch between calibration and normal recording operations timewise, and the print position deviation and gradation error initially owned by the image recording apparatus are corrected by a specific time constant, thereby enabling accurate detection in real time.

Although each of the preferred embodiments of the present invention has been described so far, the present invention is not limited to the above-described preferred embodiments and can be variously improved and modified as long as the subject matter of the present invention is not deviated. For example, some components can be deleted from the entire configuration shown in each of the above-described of the present invention. Furthermore, the different components of each of the preferred embodiments can be also combined appropriately.

The factor of the items correctable by the image correction unit in each of the above-described preferred embodiments is not limited to each nozzle space of the recording head and also includes a skew factor due to the rotation deviation of the entire head and the position deviation of the carrier unit. The correctable gradation characteristic also includes a white level, a black level, a gamma characteristic, color gradation in colored image and the like.

In each of the above-described preferred embodiments, for the recording medium, a pre-printed medium whose background is printed, a colored medium and a medium with holes can be also used. Since the reference detection information including an image on the recording medium before recording and the input recording data are related by the calibration operation in the image correction unit 10, poor recording can be detected as in a normal white recording medium. If the correction of a bi-dimensional image on the medium with background and holes and the like must be corrected, bi-dimensionally arrayed correction information is used. Poor recording due to the color difference, partial missing/dirt of the recording medium can be detected simultaneously.

Furthermore, as a means for separating poor recorded image itself from that due to the partial missing/dirt of the recording medium, two pieces of correction information memory can be also provided for the image correction unit 10. As to the procedure, firstly, inputting and recording white paper information to and on the reference recording data in the calibrating operation and comparing the detected reference detection information with the reference recording data of white paper, correction information only about the recording medium itself is obtained and is stored in the correction information memory for recording medium itself.

Then, correction information also including the correction information about the recording medium itself can be obtained by recording the above-described normal reference recording data and then corrected input recording data also including the correction information about the recording medium itself can be obtained. Furthermore, corrected input recording data only about the recording medium itself can be obtained by deducting the already detected recording medium itself from the corrected input recording data including the correction information about recording medium itself. The poor recorded image itself and poor recording due to a poor recording medium can be individually detected by checking twice using these two pieces of corrected input recording data.

The printing method is not limited to an ink-jet method and it is sufficient to be recorded in units of dots. A printer using an electrostatic or thermal printing recording head can be also used. The present invention can be also applied to a printer for offset print, perforated plate print or the like.

According to the present invention, a poor recording detection device for accurately detecting poor recording without being affected by printing position deviation and a gradation error initially owned by a printer and an image recording apparatus using it can be provided.

What is claimed is:

1. A poor recording detection device for forming dots on a recording medium on the basis of input recording data by a recording head and detecting poor recording when recording, comprising:
    an illumination unit which applies illumination light to the recording medium after the recording;
    a camera unit which shoots and picks up an image recorded on the recording medium to which the illumination light is applied by the illumination unit and which outputs detected information; and
    a poor recording determination unit which outputs reference detection information obtained by detecting a reference recording image by the camera unit after inputting reference recording data as input recording data and recording the input recording data on the recording medium as the reference recording image, generates correction information by comparing the reference detection information with the reference recording data and generating corrected input recording data obtained by correcting the input recording data on the basis of the correction information, and determines whether the poor recording has occurred on the basis of a comparison result between the input recording image information obtained by the detecting by the camera unit and the corrected input recording data after recording the input recording data on the recording medium as an input recording image.

2. The poor recording detection device according to claim 1, wherein the correction information comprises position correction information of a dot in at least one of a main direction and a sub scanning directions.

3. The poor recording detection device according to claim 1, wherein the correction information comprises gradation correction information of a dot.

4. The poor recording detection device according to claim 1, wherein the reference recording data comprises dedicated data different from the input recording data.

5. A poor recording detection device for forming dots on a recording medium on the basis of input recording data by a recording head and detecting poor recording when recording, comprising:
    an illumination unit which applies illumination light to the recording medium after the recording;
    a camera unit which shoots and picks up an image recorded on the recording medium to which the illumination light is applied by the illumination unit and which outputs detected information; and
    a poor recording determination unit which outputs input recording image information obtained by detecting an input recording image recording image by the camera unit after recording input recording data on the recording medium as an input recording image information, generates correction information by comparing the input recording image information with the input recording data and generating corrected input recording data obtained by correcting the input recording data on the basis of the correction information, and determines whether the poor recording has occurred on the basis of a comparison result between the input recording image information obtained by the detecting by the camera unit and the corrected input recording data,
    wherein the correction information generation and the poor recording determination are performed with respect to a same input recording image.

6. The poor recording detection device according to claim 5, wherein the correction information is generated by extracting a feature image from the input recording image.

7. A poor recording detection device for forming dots on a recording medium on the basis of input recording data by a recording head and detecting poor recording when recording, comprising:
    an illumination unit which applies illumination light to the recording medium after the recording; and
    a camera unit which shoots and picks up an image recorded on the recording medium to which the illumination light is applied by the illumination unit and which outputs detected information,
    wherein input recording image information obtained by detecting an input recording image recording image by the camera unit after input recording data is recorded on the recording medium as an input recording image, correction information is generated by comparing the input recording image information with the input recording data and corrected input recording data obtained by correcting the input recording data on the basis of the correction information, and a determination is made whether the poor recording has occurred on the basis of a comparison result between the input recording image information obtained by the detecting by the camera unit and the corrected input recording data,
    wherein the correction information generation and the poor recording determination are performed with respect to a same input recording image.

8. An image recording apparatus provided with a poor recording determination device for forming dots on a recording medium on the basis of input recording data by a recording head and detecting poor recording when recording, the poor recording determination device comprising:
    an illumination unit which applies illumination light to the recording medium after the recording;
    a camera unit which shoots and picks up an image recorded on the recording medium to which the illumination light is applied by the illumination unit and which outputs detected information; and
    a poor recording determination unit or outputting which outputs reference detection information obtained by detecting a reference recording image by the camera unit after inputting reference recording data as input recording data and recording the input recording data on the recording medium as a reference recording image, generates correction information by comparing the reference detection information with the reference recording data and generating corrected input recording data obtained by correcting the input recording data on the basis of the correction information, and determines whether the poor recording has occurred on the basis of a comparison result between the input recording image information obtained by the detecting by the camera unit and the corrected input recording data after recording the input recording data on the recording medium as an input recording image.

9. An image recording apparatus provided with a poor recording determination device for forming dots on a recording medium on the basis of input recording data by a recording head and detecting poor recording when recording, the poor recording determination device comprising:
- an illumination unit which applies illumination light to the recording medium after the recording;
- a camera unit which shoots and picks up an image recorded on the recording medium to which the illumination light is applied by the illumination unit and which outputs detected information; and
- a poor recording determination unit which outputs input recording image information obtained by detecting an input recording image by the camera unit after recording the input recording data on the recording medium as an input recording image, generates correction information by comparing the input recording image information with the input recording data and generating corrected input recording data obtained by correcting the input recording data on the basis of the correction information, and determines whether the poor recording has occurred on the basis of a comparison result between the input recording image information obtained by the detecting by the camera unit and the corrected input recording data, wherein the correction information generation and the poor recording determination are performed with respect to a same input recording image.

10. An image recording apparatus provided with a poor recording determination device for forming dots on a recording medium on the basis of input recording data by a recording head and detecting poor recording when recording, the poor recording determination device comprising:
- an illumination unit which applies illumination light to the recording medium after the recording;
- a camera unit which shoots and picks up an image recorded on the recording medium to which the illumination light is applied by the illumination unit and which outputs detected information; and
- a poor recording determination unit which outputs reference recording image information obtained by detecting a reference recording image by the camera unit after inputting the reference recording data as input recording data and recording the input recording data on the recording medium as a reference recording image, generates correction information by comparing the reference detection information with the reference recording data and generating corrected input recording data obtained by correcting the input recording data on the basis of the correction information, and determines whether the poor recording has occurred on the basis of a comparison result between the input recording image information obtained by the detecting by the camera unit and the corrected input recording data, wherein the reference recording image is detected by the camera unit with a higher density than a dot density of the recording head and the correction information can be obtained according to brightness information of each pixel.

11. A poor recording detection device for forming dots on a recording medium on the basis of input recording data by a recording head and detecting poor recording when recording, comprising:
- an illumination unit which applies illumination light to the recording medium after the recording;
- a camera unit which shoots and picks up an image recorded on the recording medium to which the illumination light is applied by the illumination unit and which outputs detected information; and
- a poor recording determination unit which outputs reference detection information obtained by detecting a reference recording image by the camera unit after inputting reference recording data as input recording data and recording the input recording data on the recording medium as a reference recording image, generates correction information by comparing the reference detection information with the reference recording data and generating corrected input recording image information obtained by correcting the input recording data obtained by the detecting by the camera unit on the basis of the correction information after recording the input recording data on the recording medium as an input recording image, and determines whether the poor recording has occurred on the basis of a comparison result between the corrected input recording image information obtained by the detecting by the camera unit and the corrected input recording data after recording the input recording data on the recording medium as an input recording image.

* * * * *